United States Patent [19]

Omura et al.

[11] Patent Number: 4,626,589
[45] Date of Patent: Dec. 2, 1986

[54] ORGANIC DYE COMPOUND HAVING BOTH PYRIDINIOTRIAZINYL AND VINYLSULFONE TYPE FIBER-REACTIVE GROUPS

[75] Inventors: Takashi Omura, Ashiya; Yutaka Kayane, Ibaraki; Mikoto Takahashi, Oita; Tetsuya Miyamoto, Takatsuki; Akira Takeshita, Toyonaka; Naoki Harada, Suita; Katsumasa Otake, Nara, all of Japan

[73] Assignee: Sumitomo Chemical Company, Limited, Osaka, Japan

[21] Appl. No.: 699,182

[22] Filed: Feb. 7, 1985

[30] Foreign Application Priority Data

Feb. 20, 1984 [JP] Japan .................... 59-31133

[51] Int. Cl.$^4$ .............. C09B 44/02; C09B 44/08; C09B 62/523; C09B 62/527
[52] U.S. Cl. .................... 534/605; 534/589; 534/598; 534/617; 534/636; 534/639; 534/638; 534/642; 544/181; 544/189; 544/198; 544/199
[58] Field of Search .......... 534/605, 612, 642, 636, 534/617; 544/189, 198

[56] References Cited

U.S. PATENT DOCUMENTS

| | | | |
|---|---|---|---|
| 3,223,470 | 12/1965 | Boedeker et al. | 523/638 X |
| 4,341,699 | 7/1982 | Tezuka et al. | 534/638 |
| 4,453,945 | 6/1984 | Miyamoto et al. | 534/605 X |
| 4,544,737 | 10/1985 | Stohr et al. | 534/605 |

FOREIGN PATENT DOCUMENTS 2319689  2/1977  France ................. 534/605

*Primary Examiner*—Floyd D. Higel
*Attorney, Agent, or Firm*—Stevens, Davis, Miller & Mosher

[57] ABSTRACT

A compound of the formula,

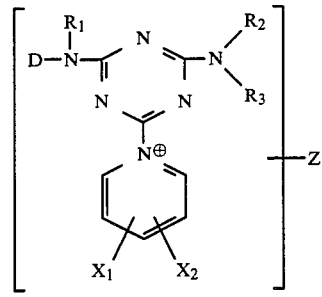

wherein D is an organic dye moiety, $R_1$ and $R_2$ are independently hydrogen or a substituted or unsubstituted lower alkyl group, $R_3$ is hydrogen or a substituted or unsubstituted lower alkyl, phenyl or naphthyl group, $X_1$ and $X_2$ are independently hydrogen, halogen or a lower alkyl, cyano, carbamoyl, vinyl, $\beta$-hydroxyethyl, $\beta$-sulfoethyl, $\beta$-sulfatoethyl, carboxyl, carboxylic acid ester or sulfonic acid group, and Z is appended to the above-defined D or $R_3$ and stands for —SO$_2$CH=CH$_2$ or —SO$_2$CH$_2$CH$_2$Y, in which Y is a group capable of being split by the action of an alkali, which is useful for dyeing hydroxyl or amido group-containing fiber materials with excellent build-up properties, thereby giving dyed products having excellent various fastness properties.

6 Claims, No Drawings

ORGANIC DYE COMPOUND HAVING BOTH PYRIDINIOTRIAZINYL AND VINYLSULFONE TYPE FIBER-REACTIVE GROUPS

The present invention relates to a novel compound having fiber-reactive groups, a method for producing the same, and a method for dyeing fiber materials by using the same.

More specifically, the present invention relates to a novel compound having both pyridiniotriazinyl group and vinylsulfone type group as a fiber-reactive group in one molecule, a method for producing the same, and a method for dyeing hydroxyl group- or amido group-containing fiber materials by using the same as a fiber-reactive dye.

Reactive dyes having a monochlorotriazinyl group, or a sulfatoethylsulfonyl group and the like which are a so-called vinylsulfone type group as a fiber-reactive group are known. Recently, reactive dyes having these two groups in one molecule have been developed to improve the dye performances of reactive dyes having any one of the two groups. However, reactive dyes of this kind are still insufficient in dye performances such as fixing efficiency, dyeing velocity, build-up property, level-dyeing property, solubility, fastness, reproducibility of dyed products and the like.

For example, U.S. Pat. No. 3,233,470 discloses a dye of the following formula,

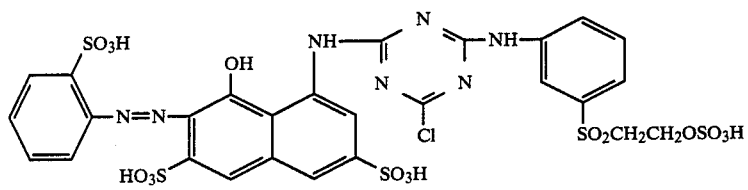

which is insufficient in the fixing efficiency as well as solubility and build-up property.

Published Unexamined Japanese Patent Application No. 90,859/1981 discloses a dye of the following formula,

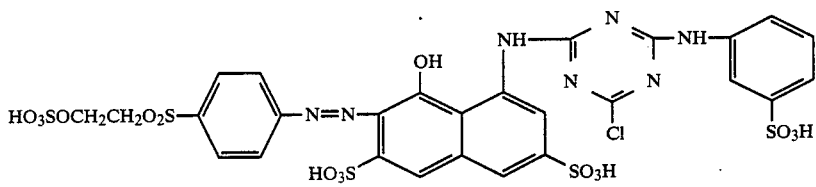

which is also insufficient in fastness, level-dyeing property and reproducibility of dyed products.

Although there are also known reactive dyes of this kind other than those described above, the dye performances obtained therefrom are still required to be further improved.

The present inventors have undertaken extensive studies to find a high performance reactive dye which can meet with the above requirements, and as a result, found that a compound having both pyridiniotriazinyl group and vinylsulfone type group in one molecule can exhibit dye performances enough to meet with the above requirements.

The present inention provides a compound having the following formula (I),

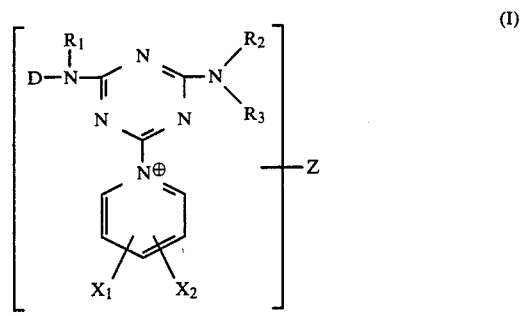

wherein D is an organic dye moiety, $R_1$ and $R_2$ are independently hydrogen or a substituted or unsubstituted lower alkyl group, $R_3$ is hydrogen or a substituted or unsubstituted lower alkyl, phenyl or naphthyl group, $X_1$ and $X_2$ are independently hydrogen, halogen or a lower alkyl, cyano, carbamoyl, vinyl, $\beta$-hydroxyethyl, $\beta$-sulfoethyl, $\beta$-sulfatoethyl, carboxyl, carboxylic acid ester or sulfonic acid group, and Z is appended to the above-defined D or $R_3$ and stands for $-SO_2CH=CH_2$ or $-SO_2CH_2CH_2Y$, in which Y is a group capable of being split by the action of an alkali, and a method for producing the compound of the formula (I), which comprises reacting a 1,3,5-trihalogeno-s-triazine, a compound of the formula (II),

wherein D is as defined above and may have the above-defined Z as a substituent, and $R_1$ is as defined above, or respective precursor compounds capable of forming the compound of the formula (II), a compound of the formula (III),

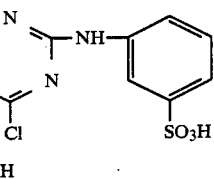

wherein $R_2$ is as defined above, and $R_3$ is as defined above and may have the above-defined Z as a substituent, and a compound of the formula (IV),

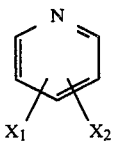

(IV)

wherein $X_1$ and $X_2$ are as defined above, in a suitable order.

The present invention also provides a method for dyeing hydroxyl group- or amido group-containing fiber materials, which comprises using the compound of the formula (I).

Among the compounds of the formula (I), preferred are the compounds of the following formula (V),

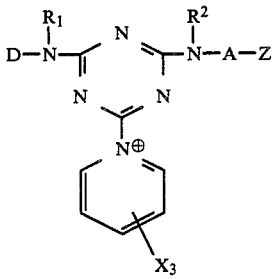

(V)

wherein D, $R_1$, $R_2$ and Z are as defined above, and A is

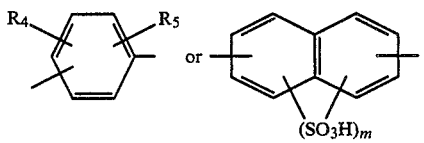

in which $R_4$ and $R_5$ are independently hydrogen, chlorine, bromine or a methyl, methoxy, ethyl, ethoxy, carboxyl or sulfonic acid group, $X_3$ is carbamoyl, β-hydroxyethyl, β-sulfoethyl, β-sulfatoethyl, carboxy or sulfo, and m is 0 or 1, and the following formula (VI),

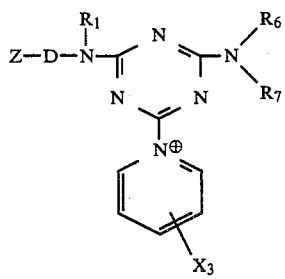

(VI)

wherein D, $R_1$, $X_3$ and Z are as defined above, and $R_6$ and $R_7$ are independently hydrogen or a substituted or unsubstituted alkyl, phenyl or naphthyl group.

More particularly preferred are the compounds of the following formula (VII),

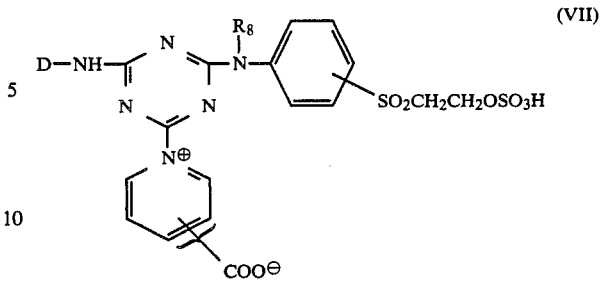

(VII)

wherein D is as defined above, and $R_8$ is hydrogen or a methyl or ethyl group, the following formula (VIII)

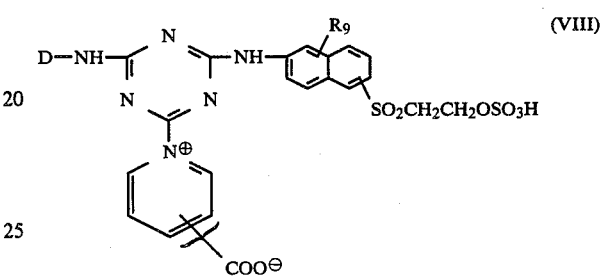

(VIII)

wherein D is as defined above, and $R_9$ is hydrogen or a sulfonic acid group, and the following formula (IX),

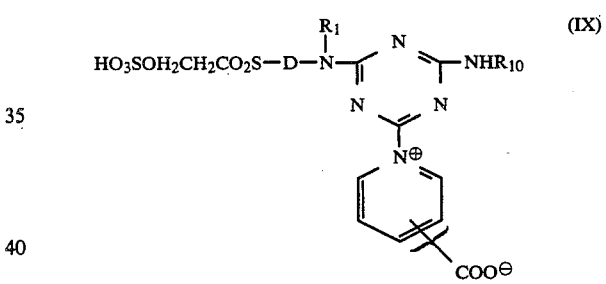

(IX)

wherein D and $R_1$ are as defined above, and $R_{10}$ is a substituted or unsubstituted phenyl or naphthyl group.

The present compounds described above are preferably in the form of an alkali metal or alkaline earth metal salt, more specifically sodium or potassium salt.

The organic dye moiety represented by D in the formula (I) includes monoazo, polyazo, metal complex azo, anthraquinone, phthalocyanine, formazan, dioxazine and nitrostilbene dye moieties.

The lower alkyl group represented by $R_1$ and $R_2$ in the formula (I) includes methyl, ethyl, propyl and butyl groups and the like. The substituent thereof includes hydroxy, carboxy, sulfo, carbamoyl, cyano and methoxycarbonyl groups and the like. Preferred $R_1$ and $R_2$ include methyl, ethyl, carbamoylethyl, hydroxyethyl and n- or iso-propyl groups.

In the formula (I), $R_3$ may be substituted or unsubstituted with the above-defined Z. Preferred Z-substituted $R_3$ is represented by —A—Z, in which A and Z are as defined above. Preferred A includes a phenyl group unsubstituted or substituted with one or two members selected from chlorine and bromine atoms and methyl, ethyl, methoxy, ethoxy and sulfonic acid groups, and a naphthylene groups unsubstituted or substituted with one sulfonic acid group. Examples thereof are as follows.

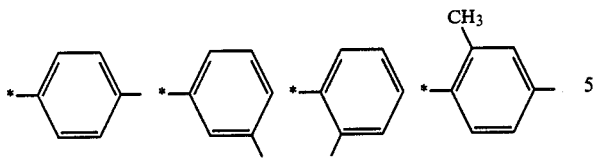
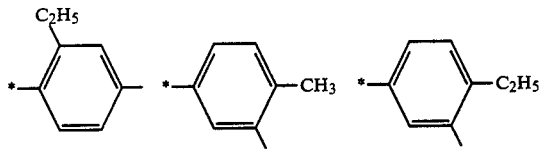
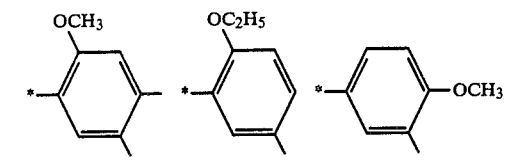
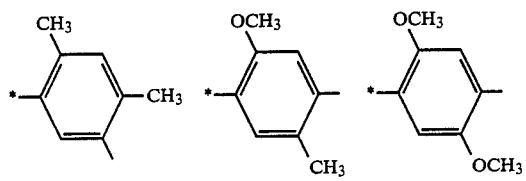
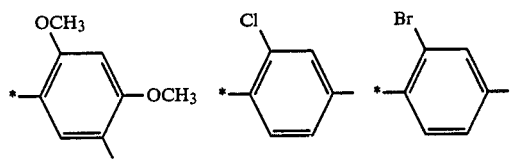
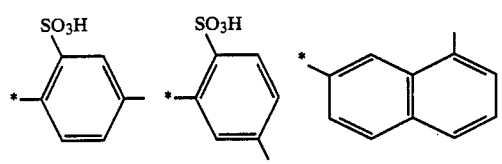
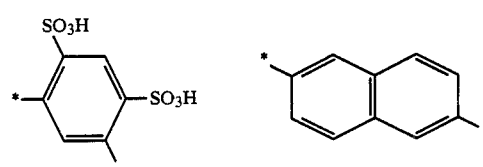
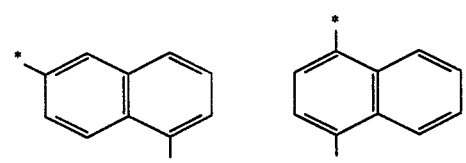
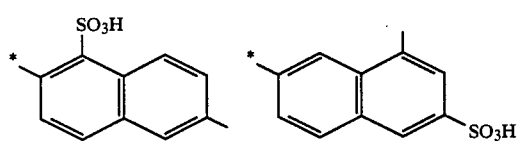
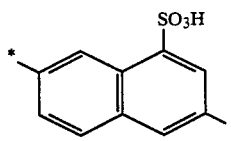

(in the above formulae, the asterisked linkage is bonded to the group, $$-\overset{R_2}{\underset{}{N}}-.)$$

Examples of the group, $$-N\overset{R_6}{\underset{R_7}{\diagdown}},$$

in the formula (VI) are amino, methylamino, ethylamino, propylamino, isopropylamino, butylamino, hexylamino, β-methoxyethylamino, γ-methoxypropylamino, β-ethoxyethylamino, N,N-dimethylamino, N,N-diethylamino, N-methyl-N-phenylamino, N-ethyl-N-phenylamino, β-chloroethylamino, β-cyanoethylamino, γ-cyanopropylamino, β-carboxyethylamino, sulfomethylamino, β-sulfoethylamino, β-hydroxyethylamino, N,N-di-hydroxy-ethylamino, γ-hydroxypropylamio, benzylamino, phenylamino, toluidino, xylidino, chloroanilino, anisidino, phenetidino, 2,- 3- or 4-sulfoanilino, 2,5 disulfoanilino, N-sulfomethylanilino, 3- or 4-carboxyphenylamino, 2-carboxy-5-sulfophenylamino, 2-carboxy-4-sulfophenylamino, 4-, 5-, 6- or 7-sulfo-1-naphthylamino, 3,6-disulfo-2-naphthylamino, 4,8-disulfo-2-naphthylamino, 6,8-disulfo-2-naphthylamino, 3,6,8-trisulfo-2-naphthylamino, 4,6,8-trisulfo-2-naphthylamino and the like.

In the case where Z in the formula (I) stands for —SO₂CH₂CH₂Y, the group Y capable of being split by the action of an alkali includes a halogen atom such as chlorine and bromine atoms, an ester group of an organic carboxylic or sulfonic acid such as a lower alkanoyloxy group including acethyloxy group, a benzoyloxy group, a benzenesulfonyloxy group, substituted or unsubstituted pyridinio group and a group represented by a free acid of the formula, —OPO₃H₂, —SSO₃H or —OSO₃H. Of these groups, —OSO₃H is particularly preferred. Thus, preferred Z is —SO₂CH₂CH₂OSO₃H, which may be partially replaced by —SO₂CH=CH₂.

The compound of the formula (II) usable for the production of the compound (I) is illustrated as follows. In the following formulae, W is a direct linkage or an aliphatic, alicyclic or aromatic bridging group.

(1) Anthraquinone compound having the following formula (a):

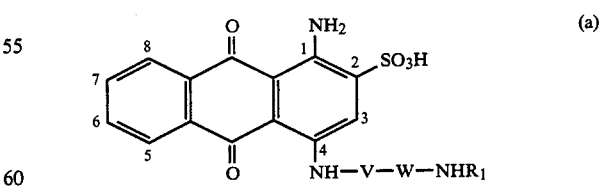

wherein W and R₁ are as defined above, the anthraquinone nucleus may be substituted additionally with a sulfonic acid group at a 5-, 6-, 7- or 8-position, and V is a divalent group of particularly benzene type such as a phenylene, diphenylene, or 4,4'-divalent stilbene or azobenzene group, each benzene being unsubstituted or substituted with one sulfonic acid group.

(2) Monoazo compound having the following formula (b):

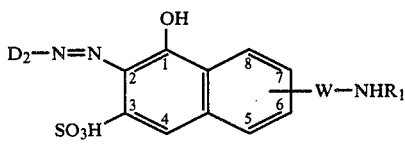

wherein W and $R_1$ are as defined above, the —W—$NHR_1$ group is preferably located at a 6-, 7- or 8-position, the naphthalene nucleus may be substituted additionally with a sulfonic acid group at a 5- or 6-position, and $D_2$ is a mono- or di-cyclic aryl group such as phenyl, diphenyl, naphthyl, stilbene and diphenylamine.

Of these manoazo compounds, particularly preferred are those having a direct linkage as W, and a mono-, di- or tri-sulfophenyl or naphthyl group as $D_2$ in which the sulfo group is preferably located at an orthoposition to the azo group, the phenyl group being unsubstituted or substituted with a halogen atom such as chlorine, an alkyl group such as methyl, an acylamino group such as acetylamino or an alkoxy group such as methoxy.

(3) Disazo-compound having the formula (b), provided that $D_2$ in the formula (b) stands for an azobenzene, azonaphthalene or phenylazonaphthalene group in place of the aryl group as defined in item (2). The naphthalene nucleus may be substituted with the group of —$NHR_1$, and in some cases with a sulfonic acid group which is preferably located at an ortho-position to the azo-group.

(4) Mono- or disazo compound having the following formula (c):

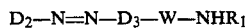

wherein W and $R_1$ are as defined above, $D_2$ is as defined in the above items (2) and (3), and $D_3$ is a 1,4-phenylene, sulfo-1,4-naphthylene or stilbene group. The benzene nucleus in the groups defined by $D_2$ and $D_3$ may be substituted with a halogen atom or an alkyl, alkoxy, carboxyl or acylamino group.

(5) Mono- or disazo compound having the following formula (d):

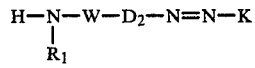

wherein W and $R_1$ are as defined above, $D_2$ is as defined in the above items (2) and (3), particularly preferably a benzene-containing group substituted with a sulfonic acid, and K is a naphtholsulfonic acid moiety or a ketomethylene moiety, which has a hydroxyl group located at an ortho-position to the azo group and which is formed into an enol or capable of forming an enol (for example, acetoacetarylide, 5-pyrazolone and 6-hydroxypyrid-2-one).

(6) Mono- or disazo compound having the following formula (e):

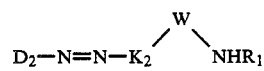

wherein W and $R_1$ are as defined above, $D_2$ is as defined in the above items (2) and (3), the $K_2$ is a ketomethylene moiety which has a hydroxyl group located at an $\alpha$-position to the azo group and is capable of forming an enol (for example, acetoacetarylide, 5-pyrazolone and 6-hydroxypyrid-2-one).

(7) Metal complex azo compound:
1:1-Metal complex, particularly copper complex which may be represented by the above formula (b), (d) or (e), provided that $D_2$ in the formulae is as defined above and has a metalizable group (for example, a hydroxyl, lower alkoxy or carboxy group) located at an ortho-position to the azo group.

(8) Phthalocyanine compound having the following formula (f):

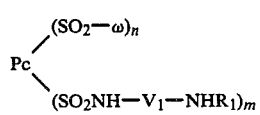

wherein $R_1$ is as defined above, Pc is a phthalocyanine nucleus, particularly copper phthalocyanine nucleus, $\omega$ is a hydroxy and/or substituted or unsubstituted amino group, $V_1$ is an aliphatic, alicyclic or aromatic bridging group, and m and n are independently 1, 2 or 3, provided that they satisfy the formula, $m+n \leq 4$.

(9) Formazan compound having the following formula (g):

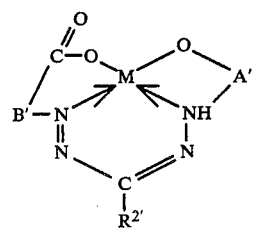

wherein M is copper or nickel, A' and B' are independently a mono- or poly-nucleus arylene group wherein the ortho-carbon atoms are bonded to the oxygen, nitrogen and carbon atoms constituting the formula (g), $R^{2'}$ is a substituted or unsubstituted hydrocarbyl group, provided that any one of A', B' or $R^{2'}$ has a group of —$NHR_1$ or —W—$NHR_1$.

(10) Nitrostilbene compound having the following formula (h):

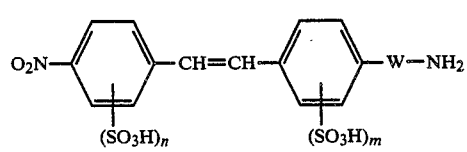

wherein W is as defined above, and m and n are independently 1 or 2.

(11) Triphendioxazine compound having the following formula (i) or (j):

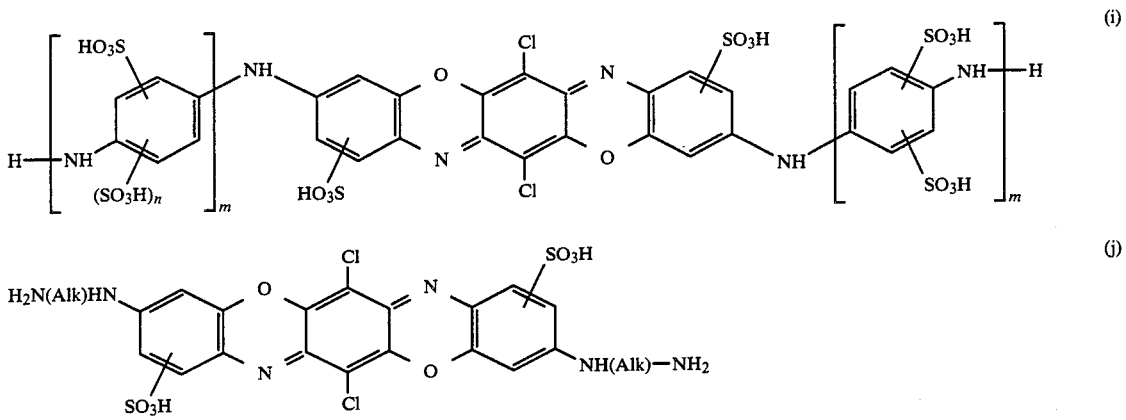

wherein m and n are independently 0 or 1, and Alk is an alkylene group having 2 to 6 carbon atoms.

Examples of the compounds illustrated in the above items (1) to (11) are as follows:

Compounds of item (1):
1-Amino-4-(4'-aminoanilino)anthraquinone-2,2'-disulfonic acid
1-Amino-4-(4'-methylaminoanilino)anthraquinone-2,3'-disulfonic acid
1-Amino-4-(3'-amino-2',4',6'-trimethylanilino)anthraquinone-2,5-disulfonic acid
1-Amino-4-(4'-aminoacetylaminoanilino)anthraquinone-2,2'-disulfonic acid
1-Amino-4-(3'-aminoanilino)anthraquinone-2,4-disulfonic acid Compounds of item (2):
6-Amino-1-hydroxy-2-(2'-sulfophenylazo)naphthalene-3-sulfonic acid
8-Amino-1-hydroxy-2-(2'-sulfophenylazo)naphthalene-3,6-disulfonic acid
7-Amino-2-(2',5'-disulfophenylazo)-1-hydroxynaphthlene-3-sulfonic acid
7-Methylamino-2-(2'-sulfophenylazo)-1-hydroxynaphthalene-3-sulfonic acid
7-Methylamino-2-(4'-methoxy-2'-sulfophenylazo)-1-hydroxynaphthalene-3-sulfonic acid
8-(3'-Aminobenzoylamino)-1-hydroxy-2-(2'-sulfophenylazo)naphthalene-3,6-disulfonic acid
8-Amino-1-hydroxy-2,2'-azonaphthalene-1',3,5',6-tetrasulfonic acid
6-Amino-1-hydroxy-2-(4'-acetylamino-2'-sulfophenylazo)naphthalene-3-sulfonic acid
6-Methylamino-1-hydroxy-2-(4'-methoxy-2'-sulfophenylazo)naphthalene-3-sulfonic acid
8-Amino-1-hydroxy-2-(2',5'-disulfophenylazo)naphthalene-3,6-disulfonic acid
8-Amino-1-hydroxy-2,2'-azonaphthalene-1',3,6-trisulfonic acid
6-Amino-1-hydroxy-2-(4'-methoxy-2'-sulfophenylazo)naphthalene-3-sulfonic acid
8-Amino-1-hydroxy-2,2'-azonaphthalene-1',3,5-trisulfonic acid
6-Amino-1-hydroxy-2,2'-azonaphthalene-1',3,5'-trisulfonic acid
6-Methylamino-1-hydroxy-2,2'-azonaphthalene-1',3,5'-trisulfonic acid
7-Amino-1-hydroxy-2,2'-azonaphthalene-1,',3-disulfonic acid
8-Amino-1-hydroxy-2-(3'-carboxyphenylazo)naphthalene-3,6-disulfonic acid
6-Amino-1-hydroxy-2-(4'-sulfo-3'-carboxyphenylazo)naphthalene-3,5-disulfonic acid
8-Amino-1-hydroxy-2,2'-azonaphthalene-1',3,5,5'-tetrasulfonic acid
6-Amino-1-hydroxy-2,2'-azonaphthalene-3,3',6'-trisulfonic acid
7-Amino-4-hydroxy-3-(2'-methoxyphenylazo)naphthalene-2,5'-disulfonic acid
2-Amino-5-hydroxy-6-(4'-methoxyphenylazo)naphthalene-1,2',7-trisulfonic acid Compounds of item (3):
8-Amino-1-hydroxy-2-[4'-(2''-sulfophenylazo)-2'-methoxy-5'-methylphenylazo]naphthalene-3,6-disulfonic acid
6-Amino-1-hydroxy-2-[4'-(2''-sulfophenylazo)-2'-methoxy-5'-methylphenylazo]naphthalene-3,5-disulfonic acid
8-ω-(N-Methylamino)acetylamino-1-hydroxy-2-[4'-(2'',5''-disulfophenylazo)-2'-methoxy-5'-methylphenylazo]-naphthalene-3,6-disulfonic acid
6-Amino-1-hydroxy-2-[4'-(2'',5''-disulfophenylazo)-2'-methoxy-5'-methylphenylazo]naphthalene-3-sulfonic acid Compounds of item (4):
2-(4'-Amino-2'-methylphenylazo)naphthalene-4,8-disulfonic acid
2-(4'-Amino-2'-acetylaminophenylazo)naphthalene-5,7-disulfonic acid
2-(4'-Amino-2'-ureidophenylazo)naphthalene-3,6,8-trisulfonic acid
4-Nitro-4'-(4''-methylaminophenylazo)stilbene-2,2'-disulfonic acid
4-Nitro-4'-(4''-amino-2''-methyl-5''-methoxyphenylazo)stilbene-2,2'-disulfonic acid
2-(4'-Amino-2'-acetylaminophenylazo)naphthalene-4,8-disulfonic acid
4-Amino-2-methylazobenzene-2',5'-disulfonic acid
4-[4'-(2'',5''-disulfophenylazo)-2',5'-dimethylphenylazo]-1-naphthylamine-8-sulfonic acid
4-[4'-(2'',5'',7''-trisulfonaphtho-1''-ylazo)-2',5'-dimethylphenylazo]-1-naphthylamine-8-sulfonic acid
2-(4'-Methylaminoacetylamino-2'-ureidophenylazo)-naphthalene-3,6,8-trisulfonic acid
4-[4'-(2'',5'',7''-Trisulfonaphtho-1''-ylazo)-2',5'-dimethylphenylazo]-1-naphthylamine-8-sulfonic acid
4-[4'-(4'',8''-Disulfonaphtho-2'-ylazo)-7'-sulfonaphtho-1'-ylazo]-1-naphthylamino-8-sulfonic acid
4-[4'-(2'',5'',7''-Trisulfonaphtho-1''-ylazo)naphtho-1'-ylazo]-1-naphthylamine-6-sulfonic acid 4-[4'-(2″,5″-Disulfophenylazo)-6'-sulfonaphtho-1'-ylazo]-1-naphthylamine-8-sulfonic acid 4-[4'-(4″-Sulfophenylazo)-2'-sulfophenylazo]-1-naphthylamine-6-sulfonic acid Compounds of item (5)

1-(2',5'-Dichloro-4'-sulfophenyl)-3-methyl-4-(3″-amino-4″-sulfophenylazo)-5-pyrazolone 1-(4'-Sulfophenyl)-3-carboxy-4-(4″-amino-3″-sulfophenylazo)-5-pyrazolone 1-(2'-Methyl-5'-sulfophenyl)-3-methyl-4-(4″-amino-3″-sulfophenylazo)-5-pyrazolone 1-(2'-Sulfophenyl)-3-methyl-4-(3″-amino-4″-sulfophenylazo)-5-pyrazolone 4-Amino-4'-(3″-methyl-5″-oxo-1″-phenylpyrazolin-4″-ylazo)stilbene-2,2'-disulfonic acid 4-Amino-4'-(2″-hydroxy-3″,6″-disulfo-1″-naphthylazo)stilbene-2,2'-disulfonic acid 8-Acetylamino-1-hydroxy-2-(5'-amino-2'-sulfophenylazo)naphthalene-3,6-disulfonic acid 7-3'-Sulfophenylamino-1-hydroxy-2-(4'-amino-2'-carboxyphenylazo)naphthalene-3-sulfonic acid 7-(3'-Sulfophenylamino)-1-hydroxy-2-(5'-amino-2'-sulfophenylazo)naphthalene-3-sulfonic acid 8-Phenylamino-1-hydroxy-2-(4'-amino-2'-sulfophenylazo)naphthalene-3,6-disulfonic acid 6-Acetylamino-1-hydroxy-2-(5'-amino-2'-sulfophenylazo)naphthalene-3-sulfonic acid 8-Propyonylamino-1-hydroxy-2-(5'-amino-2'-sulfophenylazo)naphthalene-3,6-disulfonic acid 8-Benzoylamino-1-hydroxy-2-(5'-amino-2'-sulfophenylazo)naphthalene-3,6-disulfonic acid 1-(4',8'-Disulfonaphtho-2'-yl)-3-methyl-4-(5″-amino-2″-sulfophenylazo)-5-pyrazolone 1-(2'-Sulfophenyl)-3-carboxy-4-5″-amino-2″-sulfophenylazo)-5-pyrazolone 1-(2',5'-Dichloro-4'-sulfophenyl)-3-methyl-4-(5″-amino-2″-sulfophenylazo)-5-pyrazolone 5-(5'-Amino-2'-sulfophenylazo)-4-methyl-6-hydroxy-N-ethylprid-2-one 5-(5'-Amino-2'-sulfophenylazo)-4-methyl-3-carbamoyl-6-hydroxy-N-ethylpyrid-2-one 5-(5'-Amino-2',4'-disulfophenylazo)-4-methyl-6-hydroxy-N-ethylpyrid-2-one 5-(5'-Amino-2'-sulfophenylazo)-4-methyl-3-cyano-6-hydroxy-N-methylpyrid-2-one 5-(4'-Amino-2'-sulfophenylazo)-4-methyl-3-cyano-6-hydroxy-N-ethylpyrid-2-one 5-(4'-Amino-2',5'-disulfophenylazo)-4-methyl-3-cyano-6-hydroxy-N-ethylpyrid-2-one 5-(5'-Amino-2'-sulfophenylazo)-3,4-dimethyl-6-hydroxy-1-n-propylpyrid-2-one 5-(4'-Amino-2',5'-disulfophenylazo)-1-n-butyl-6-hydroxy-4-methyl-3-sulfomethylpyrid-2-one 5-(5'-Amino-2'-sulfophenylazo)-1-ethyl-6-hydroxy-4-methyl-3-sulfopyrid-2-one 5-(5'-Amino-2'-sulfophenylazo)-3-chloro-1-ethyl-6-hydroxy-4-methylpyrid-2-one 5-(5'-Amino-2'-sulfophenylazo)-3-cyano-1-ethyl-6-hydroxy-4-sulfomethylpyrid-2-one 5-(5'-Amino-2'-sulfophenylazo)-3-carbamoyl-6-hydroxy-4-methyl-1-[2'-(4″-sulfophenyl)ethyl]pyrid-2-one 1-Hydroxy-2-(1'-sulfo-5'-aminomethylnaphtho-2'-ylazo)-8-benzoylaminonaphthalene-3,6-disulfonic acid 1-(2',5'-Dichloro-4'-sulfophenyl)-3-methyl-4-(1″-sulfo-5″-aminomethylnaphtho-2″-ylazo)-5-pyrazolone 1-(4'-Sulfophenyl)-3-carboxy-4-(1″-sulfo-5″aminomethylnaphtho-2″-ylazo)-5-pyrazolone 1-Hydroxy-2-(1'-sulfo-5'-aminomethylnaphtho-2'-ylazo)-6-acetylaminonaphthalene-3-sulfonic acid 1-Hydroxy-2-(1'-sulfo-5'-aminomethylnaphtho-2'-ylazo)-8-benzoylaminonaphthalene-3,5-disulfonic acid 1-Hydroxy-2-(1'-sulfo-5'-aminomethylnaphtho-2'-ylazo)-6-(N-acetyl-N-methyl)aminonaphthalene-3-sulfonic acid 1-Hydroxy-2-(1'-sulfo-5'-aminomethylnaphtho-2'-ylazo)-7-acetylaminonaphthalene-3-sulfonic acid 1-Hydroxy-2-[4'-(1″-sulfo-5″-aminomethylnaphtho-2″-ylazo]-6'-sulfonaphtho-1'-ylazo]-8-acetylaminonaphthalene-3,6-disulfonic acid 1-Hydroxy-2-(1'-sulfo-5'-aminomethylnaphtho-2'-ylazo)-7-(2″,5″-disulfophenylazo)-8-aminonaphthalene-3,6-disulfonic acid 1-Hydroxy-2-(2'-sulfo-5'-aminophenylazo)-7-(4″-sulfophenylazo)-8-aminonaphthalene-3,6-disulfonic acid 1-Hydroxy-2-(1'-sulfo-5'-aminomethylnaphtho-2'-ylazo)-8-acetylaminonaphthalene-3,6-disulfonic acid 1-Hydroxy-2-[4'-(5″-aminomethyl-4″-methyl-2″-sulfophenylazo)-6'-sulfonaphtho-1'-ylazo]-6-acetylaminonaphthalene-3-sulfonic acid 5-(5'-Aminoethyl-4'-methyl-2'-sulfophenylazo)-1-ethyl-6-hydroxy-4-methyl-3-sulfopyrid-2-one 1-Hydroxy-7-(5'-amino-2'-sulfophenylazo)-2-(1″,5″-disulfonaphtho-2″-ylazo)-8-aminonaphthalene-3,6-disulfonic acid 1-Hydroxy-2-(5'-amino-2'-sulfophenylazo)-6-benzoylaminonaphthalene-3,5-disulfonic acid 1-Hydroxy-2-[4'-(4″-aminomethyl-2″-sulfophenylazo)-2'-methoxyphenylazo]naphthalene-3,6,8-trisulfonic acid 1-Hydroxy-2-(4'-aminomethylphenylazo)-6-acetylaminonaphthalene-3,5-disulfonic acid 4-Amino-2-[2'-hydroxy-1'-(2″-methoxy-5″-methylphenylcarbamoyl)-1'-propenylazo]benzene-1,4″-disulfonic acid Compounds of items (6):

1-(3'-Aminophenyl)-3-methyl-4-(2',5'-disulfophenylazo)-5-pyrazolone 1-(3'-Aminophenyl)-3-carboxy-4-(2'-carboxy-4'-sulfophenylazo)-5-pyrazolone 4-Amino-4'-[3″-methyl-4″-(2‴,5‴-disulfophenylazo)-1″-pyrazol-5″-onyl]stilbene-2,2'-disulfonic acid 1-(3'-Aminophenyl)-3-carboxy-4-[4″-(2‴,5‴-disulfophenylazo)-2″-methoxy-5″-methylphenylazo]-5-pyrazolone 1-(2'-Aminoethyl)-5-1',5'-disulfonaphtho-2'-ylazo)-6-hydroxy-4-methylpyrid-2-one 1-(2'-Aminoethyl)-3,4-dimethyl-5-(1',5'-disulfonaphtho-2'-ylazo)-6-hydroxpyrid-2-one 3-Carbamoyl-1-(2-aminoethyl)-6-hydroxy-4-methyl-5-(3',6',8'-trisulfonaphtho-2'-ylazo)pyrid-2-one 1-(2'-Aminoethyl)-3-cyano-5-(2',5'-sulfophenylazo)-6-hydroxy-4-methylpyrid-2-one 2-[2'-Hydroxy-1'-(4″-amino-2″-methoxy-5″-sulfophenylcarbamoyl)-1'-propenylazo]naphthalene-3,6,8-trisulfonic acid 2-[2'-Hydroxy-1'-(4″-amino-2″-methoxy-5″-sulfophenylcarbamoyl)-1'-propenylazo]naphthalene-1,5-, 3,6-, 5,7-, 4,8-, or 6,8-disulfonic acid 4-Methoxy, ethoxy, methyl or ethyl-3-[2'-hydroxy-1'-(4"- or 5"-amino-2"-sulfophenylcarbamoyl)-1'-propenylazo]benzenesulfonic acid 3-Methoxy, ethoxy, methyl or ethyl-4-[2'-hydroxy-1'-(4"- or 5"-amino-2"-sulfophenylcarbamoyl)-1'-propenylazo]benzenesulfonic acid 3-Methoxy-6-methyl-4-[2'-hydroxy-1'-(4"-amino-2"-methoxy-5"-sulfophenylcarbamoyl)-1'-propenylazo]benzenesulfonic acid 5-Acetylamino-2-[2'-hydroxy-1'-(4"-amino-2"-methoxy-5"-sulfophenylcarbamoyl)-1'-propenylazo]-benzenesulfonic or carboxylic acid 5-Methyl-2-[4'-[2"-hydroxy-1"-(4"'-amino-2"'-sulfophenylcarbamoyl)-1"-propenylazo]-3'-sulfophenyl]-benzothiazole-4-sulfonic acid Compounds of item (7):

Copper complex of 8-amino-1-hydroxy-2-(2'-hydroxy-5'-sulfophenylazo)naphthalene-3,6-disulfonic acid Copper complex of 6-amino-1-hydroxy-2-(2'-hydroxy-5'-sulfophenylazo)naphthalene-3-sulfonic acid Copper complex of 6-amino-1-hydroxy-2-(2'-hydroxy-5'-sulfophenylazo)naphthalene-3,5-disulfonic acid Copper complex of 8-amino-1,1'-dihydroxy-2,2'-azonaphthalene-3,4',6,8'-tetrasulfonic acid Copper complex of 8-amino-1-hydroxy-2-[4'-sulfophenylazo)-2'-methoxy-5'-methylphenylazo]naphthalene-3,6-disulfonic acid Copper complex of 6-amino-1-hydroxy-2-[4'-(2",5"-disulfophenylazo)-2'-methoxy-5'-methylphenylazo]-naphthalene-3,5-disulfonic acid Copper complex of 1-(3'-amino-4'-sulfophenyl)-3-methyl-4-[4"-(2"',5"'-disulfophenylazo)-2"-methoxy-5"-methylphenylazo]-5-pyrazol Copper complex of 7-(4'-amino-3'-sulfoanilino)-1-hydroxy-2-[4"-(2"',5"'-disulfophenylazo-2"-methoxy-5"-methylphenylazo]naphthalene-3-sulfonic acid Copper complex of 6-(4'-amino-3'-sulfoanilino)-1-hydroxy-2-(2"-carboxyphenylazo)naphthalene-3-sulfonic acid Copper complex of 1-hydroxy-2-[4'-(5"-aminomethyl-4"-methyl-2"-sulfophenylazo)-5'-methyl-2'-hydroxyphenylazo]-8-acetylaminonaphthalene-3,6-disulfonic acid Copper complex of 1-hydroxy-2-[5'-hydroxy-6'-(3"-amino-2"-hydroxy-5"-sulfophenylazo)-7'-sulfonaphtho-1'-ylazo]naphthalene-3,6,8-trisulfonic acid Compounds of item (8):

3-(3'-Amino-4'-sulfophenyl)sulfamyl copper phthalocyanine-tri-3-sulfonic acid 4-(3'-Amino-4'-sulfophenyl)sulfamyl copper phthalocyanine-tri-4-sulfonic acid 3-(3'- or 4'-Aminophenyl)sulfamyl copper phthalocyanine-3-sulfonamido-di-3-sulfonic acid 3-(2-Aminoethyl)sulfamyl copper phthalocyaninetri-3-sulfonic acid Compounds of item (9):

Copper complex of N-(2-hydroxy-5-sulfo-3-aminophenyl)-N'-(2'-carboxy-4'- or 5'-sulfophenyl)-ms-phenylformazan Copper complex of N-(2-hydroxy-5-sulfo-3-aminophenyl)-N-(2'-(2'-carboxy-4'- or 5'-sulfophenyl)-ms-(4"-sulfophenyl)formazan Copper complex of N-(2-hydroxy-5-sulfophenyl)-N'-(2'-carboxy-4'-aminophenyl)-ms-(2"-sulfophenyl)-formazan Copper complex of N-(2-hydroxy-5-sulfophenyl)-N'-(2'-carboxy-4'-aminophenyl)-ms-(2"-chloro-5"-sulfophenyl)formazan Copper complex of N-(2-hydroxy-5-sulfophenyl)-N'-(2-N'-(2'-carboxy-4'- or 5'-sulfophenyl)-ms-(4-aminophenyl)formazan Copper complex of N-(2-hydroxy-5-sulfophenyl)-N'-(2'-carboxy-4'- or 5'-sulfophenyl)-ms-(4"'-amino-2"-sulfophenyl)formazan Copper complex of N-(2-hydroxy-4-aminophenyl)-N'-(2'-hydroxy-4'-sulfonaphtho-1'-yl)-ms-(2"-sulfophenyl)formazan Compounds of item (10):

4-Amino-4'-nitrostilbene-2,2'-disulfonic acid

Compounds of item (11):

3,10-Diamino-6,13-dichlorotriphendioxazine-4,11-disulfonic acid 3,10-Bis(4'-amino-3'-sulfoanilino)-6,13-dichlorotriphendioxazine-4,11-disulfonic acid 3,10-Bis(4'-amino-2',5'-disulfoanilino)-6,13-dichlorotriphendioxazine-4,11-disulfonic acid 3-(4'-Amino-3'-sulfoanilino)-10-(4'-amino-2',5'-disulfoanilino)-6,13-dichlorotriphendioxazine-4,11-disulfonic acid 3,10-Di-(2'-aminoethylamino)-6,13-dichlorotriphendioxazine-4,11-disulfonic acid 3,10-Bis(3'-amino-4'-sulfoanilino)-6,13-dichlorotriphendioxazine-4,11-disulfonic acid In addition to the above compounds, the compound of the formula (II), wherein D has the above-defined Z as a substituent may be used for the production of the compound (I). Examples thereof are as follows:

6-Amino-1-hydroxy-2-(2',3' or 4'-β-sulfatoethylsulfonylphenylazo)naphthalene-3-sulfonic acid 6-Amino-1-hydroxy-2-(2'-methoxy-5'-β-sulfatoethylsulfonylphenylazo)naphthalene-3-sulfonic acid 8-Amino-1-hydroxy-2-(6'-β-sulfatoethyl sulfonyl-1'-sulfonaphtho-2'-ylazo)naphthalene-3,5- or 3,6-disulfonic acid 6-Amino-1-hydroxy-2-(6'-β-sulftoethylsulfonyl-1'-sulfonaphto-2'-ylazo)naphthalene-3-sulfonic acid 8-Amino-1-hydroxy-2-(8'-β-sulfatoethylsulfonylnaphto-2'-ylazo)naphtalene-3,5- or 3,6-disulfonic acid 6-Amino-1-hydroxy-2-(8'-β-sulfatoethylsulfonyl-6'-sulfonaphto-2'-ylazo)naphtalene-3-sulfonic acid 6-Amino-1-hydroxy-2-(4'-methoxy-5'-β-sulfatoethylsulfonylphenylazo)naphthalene-3-sulfonic acid 7-Amino-1-hydroxy-2-(4'-β-sulfatoethylsulfonylphenylazo)naphthalene-3-sulfonic acid 8-Amino-1-hydroxy-2-(2',3' or 4'-β-sulfatoethylsulfonylphenylazo)naphthalene-3,6-disulfonic acid 8-Amino-1-hydroxy-2-(2',3' or 4'-vinylsulfonylphenylazo)naphthalene-3,6-disulfonic acid 4-Amino-2-methyl-5-methoxy-2',3' or 4'-β-sulfatoethylsulfonylazobenzene 4-Amino-2-acetylamino-2',3' or 4'-β-sulfatoethylsulfonylazobenzene 4-Amino-2-ureido-2',3' or 4'-β-sulfatoethylsulfonylazobenzene The compounds of the formula (III) having no Z-substituent usable for the production of the compound (I) are exemplified as follows.

Ammonia, Methylamine, Ethylamine, n- or iso-Propylamine, n- or sec-Butylamine, Hexylamine, 2-

Methoxyethylamine, 3-Methoxypropylamine, 2-Ethoxyethylamine, Dimethylamine, Diethylamine, 2-Chloroethylamine, 2-Cyanoethylamine, 3-Cyanopropylamine, 2-Carboxyethylamine, Sulfomethylamine, Taurine, N-methyltaurine, mono, di or triethanolamine, 3-Hydroxypropylamine, Benzylamine, Aniline, 2-, 3- or 4-Toluidine, Xylidine, N-methylaniline, N-ethylaniline, 2-, 3- or 4-Chloroaniline, Anisidine, Phenetidine, 2-, 3- or 4-Benzenesulfonic acid, 2-sulfo-4-methylaniline, 2-Sulfo-4-chloroaniline, 2- or 3-sulfo-4-methoxyaniline, 2-Sulfo-3- or 4-acetoxyaniline, 2- or 4-methoxycarbonylaniline, 3,5-dicarboxyaniline, Aniline-2,4- or 2,5-disulfonic acid, N-sulfomethylaniline, 2-, 3- or 4-aminobenzoic acid, 2-Amino-4- or 5-sulfobenzoic acid, 3-Sulfo-4-chloroaniline, 1-Naphthylamine, 1-Naphthylamine-4, 5-, 6- or 7-sulfonic acid, 1-Naphthylamine-4,7- or 4,8-disulfonic acid, 2-Naphthylamine-3,6-, 4,8- or 6,8-disulfonic acid, 2-Naphthylamine-3,6,8- or 4,6,8-trisulfonic acid, 2-Naphthylamine-1-, 5-, 6-, 7- or 8-sulfonic acid.

The compounds of the formula (III) having the Z-substituent on the alkyl group are exemplified as follows.

2-($\beta$-Sulfatoethylsulfonyl)-ethylamine
3-$\beta$-Sulfatoethylsulfonyl)-n-propylamine
1-($\beta$-Sulfatoethylsulfonyl)-iso-propylamine
4-($\beta$-Sulfatoethylsulfonyl)-butylamine,
2-($\beta$-Sulfatoethylsulfonyl)-iso-butylamine
5-($\beta$-Sulfatoethylsulfonyl)-pentylamine
2-($\beta$-Sulfatoethylsulfonyl)-hexylamine
N-Methyl-N-2-($\beta$-sulfatoethylsulfonyl)-ethylamine
N-Ethyl-N-2-($\beta$-sulfatoethylsulfonyl)-ethylamine
N-Propyl-N-2-($\beta$-sulfatoethylsulfonyl)-ethylamine
N-Butyl-N-2-($\beta$-sulfatoethylsulfonyl)-ethylamine
N-Pentyl-N-2-($\beta$-sulfatoethylsulfonyl)-ethylamine
N-Hexyl-N-2-($\beta$-sulfatoethylsulfonyl)-ethylamine
N-Carboxymethyl-N-2-($\beta$-sulfatoethylsulfonyl)-ethylamine
N-Sulfatomethyl-N-2-($\beta$-sulfatoethylsulfonyl)-ethylamine
N-2-Carboxyethyl-N-3-($\beta$-sulfatoethylsulfonyl)-propylamine
N-Sulfatoethyl-N-3-($\beta$-sulfatoethylsulfonyl)-propylamine
N-2-Sulfatoethyl-N-4-($\beta$-sulfatoethylsulfonyl)-butylamine
N-2-Ethoxyethyl-N-4-($\beta$-sulfatoethylsulfonyl)-butylamine
N-3-Chloropropyl-N-2-($\beta$-sulfatoethylsulfonyl)-ethylamine
N-Phenyl-N-2-($\beta$-sulfatoethylsulfonyl)-ethylamine
N-p-Chlorophenyl-N-2-($\beta$-sulfatoethylsulfonyl)ethylamine
N-o-Methylphenyl-N-2-($\beta$-sulfatoethylsulfonyl)ethylamine
N-p-Methoxyphenyl-N-2-($\beta$-sulfatoethylsulfonyl)ethylamine
N-m-Sulfophenyl-N-2-($\beta$-sulfatoethylsulfonyl)ethylamine
N-p-Sulfophenyl-N-2-($\beta$-sulfatoethylsulfonyl)ethylamine.

The compounds of the formula (III) having the Z-substituent on the phenyl or naphthyl group are exemplified as follows.

1-Aminobenzene-2-, 3- or 4-$\beta$-sulfatoethylsulfone
1-Aminobenzene-3-$\beta$-phosphatoethylsulfone
1-Amino-4-methylbenzene-3-$\beta$-sulfatoethylsulfone
1-Aminobenzene-3-$\beta$-chloroethylsulfone
1-Amino-4-methoxybenzene-3-$\beta$-sulfatoethylsulfone
1-Amino-2,5-dimethoxybenzene-4-$\beta$-sulfatoethylsulfone
1-Amino-2-methoxybenzene-4-$\beta$-sulfatoethylsulfone
1-Amino-2-chlorobenzene-4-$\beta$-sulfatoethylsulfone
1-Amino-2-methoxybenzene-5-$\beta$-sulfatoethylsulfone
2-Aminonaphthalene8-$\beta$-sulfatoethylsulfone
2-Aminonaphthalene-8-$\beta$-sulfatoethylsulfone-6-sulfonic acid
1-Amino-2,5-dimethoxybenzene-4-vinylsulfone
1-Amino-2-methoxy-5-methylbenzene-4-$\beta$-sulfatoethylsulfone
2-Aminonaphthalene-4-, 5-, 6- or 7-$\beta$-sulfatoethylsulfone
1-Amino-2-bromobenzene-4-$\beta$-sulfatoethylsulfone
1-Amino-2-bromobenzene-4-vinylsulfone
2-Amino-8-sulfonaphthalene-6-$\beta$-sulfatoethylsulfone
2-Aminonaphthalene-8-$\beta$-phosphatoethylsulfone-6-sulfonic acid
2-Aminonaphthalene-8-vinylsulfone-6-sulfonic acid
1-Amino-2-methoxy-5-methylbenzene-4-$\beta$-chloroethylsulfone
1-Aminobenzene-2-, 3- or 4-vinylsulfone
1-Amino-2-methoxy-5-chlorobenzene-4-$\beta$-sulfatoethylsulfone or -4-vinylsulfone,
1-Amino-2-ethoxy-5-chlorobenzene-4-$\beta$-sulfatoethylsulfone or -4-vinylsulfone,
2-Aminonaphthalene-6-$\beta$-sulfatoethylsulfone-1-sulfonic acid,
5-Chloroaniline-2-$\beta$-sulfatoethylsulfone,
5-Sulfoaniline-2-$\beta$-sulfatoethylsulfone,
Aniline-2-$\beta$-thiosulfatoethylsulfone,
m- or p-Sulfatoethylsulfonylaminoaniline,
m- or p-Sulfatoethylsulfonylmethylaniline,
5-Chloroaniline-2-$\beta$-thiosulfatoethylsulfone,
5-Sulfoaniline-2-$\beta$-thiosulfatoethylsulfone,
Aniline-2-$\beta$-phosphatoethylsulfone,
5-Chloroaniline-2-$\beta$-phosphatoethylsulfone,
5-Sulfoaniline-2-$\beta$-phosphatoethylsulfone,
5-Chloroaniline-2-vinylsulfone,
5-Sulfoaniline-2-vinylsulfone,
Aniline-2-$\beta$-chloroethylsulfone,
5-Chloroaniline-2-$\beta$-chloroethylsulfone,
5-Sulfoaniline-2-$\beta$-chloroethylsulfone, and their N-substituted compounds with a lower alkyl such as methyl, ethyl, n- or iso-propyl, n-, iso- or sec-butyl, 2-hydroxyethyl, 2- or 3-hydroxypropyl, 2-, 3- or 4-hydroxybutyl, 2,3- or 3,4-dihydroxybutyl, cyanomethyl, 2-cyanoethyl, 3-cyanopropyl, methoxymethyl, ethoxymethyl, 2-methoxy or ethoxyethyl, 3-methoxy or ethoxypropyl, 2-hydroxy-3-methoxypropyl, chloromethyl, bromomethyl, 2-chloro or bromoethyl, 3-chloro or bromopropyl, 4-chloro or bromobutyl, carboxymethyl, 2-carboxyethyl, 3-carboxypropyl, 4-carboxybutyl, 1,2-dicarboxyethyl, carbamoylmethyl, 2-carbamoylethyl, 3-carbamoylpropyl, 4-carbamoylbutyl, methoxycarbonylmethyl, ethoxycarbonylmethyl, 2-methoxy or ethoxycarbonylethyl, 3-methoxy or ethoxycarbonylpropyl, 4-methoxy or ethoxycarbonylbutyl, methylcarbonyloxymethyl, ethylcarbonyloxymethyl, 2-methyl or ethylcarbonyloxyethyl, 3-methyl or ethylcarbonyloxypropyl, 4-methyl or ethylcarbonyloxybutyl, sulfomethyl, 2-sulfoethyl, 3-sulfopropyl, 4-sulfobutyl, sulfamoylmethyl, 2-sulfamoylethyl, 3-sulfamoylpropyl and 4-sulfamoylbutyl.

The compounds of the formula (IV) usable for the production of the compound (I) are preferably those which have no or few odor. Examples thereof are $\beta$- or $\gamma$-nicotinic amide, $\beta$- or $\gamma$-(2-hydroxyethyl)pyridine, $\beta$- or γ-(2-sulfoethyl)pyridine, β- or γ-(2-sulfatoethyl)pyridine, nicotinic acid, isonicotinic acid, cinchomeronic acid, dinicotinic acid, isocinchomeronic acid, β- or γ-sulfopyridine and the like.

All the starting compounds described above may be used in the form of a free acid or a salt, preferably in the form of an alkali metal or alkaline earth metal salt.

The compound of the formula (I) can be produced by reacting a 1,3,5-trihalogeno-s-triazine, the compound (II) or respective precursor compounds capable of forming the compound (II), the compound (III) and the compound (IV), in a suitable order.

More concretely speaking, the compound of the formula (I) can be produced by (1) subjecting the 1,3,5-trihalogeno-s-triazine to first-step condensation with the compound of the formula (II), followed by a second-step condensation with the compound of the formula (III), and then a third-step condensation with the compound of the formula (IV), or (2) subjecting the 1,3,5-trihalogeno-s-triazine to first-step condensation with the compound of the formula (III), followed by a second-step condensation with the compound of the formula (II), and then a third-step condensation with the compound of the formula (IV), or (3) subjecting the 1,3,5-trihalogeno-s-triazine to first-step condensation with a precursor compound capable of forming the compound (II), followed by a second-step condensation with the compound of the formula (III), and then a third-step condensation with the compound of the formula (IV) after condensing the second condensation product with a remaining precursor compound capable of forming the compound of the formula (II).

Although the order of the condensation may be chosen from those described above, it is preferred to use a compound having a lower reactivity to the 1,3,5-trihalogeno-s-triazine on earlier stage.

In the first-step condensation, although the reaction conditions may be determined depending on the stability of the starting compound and intermediate compound to be produced, the reaction may be carried out at a relatively low pH ranging from 2 to 6, preferably from 2 to 5, and at a relatively low temperature ranging from −5° to 20° C., preferably from 0° to 10° C.

In the second-step condensation, the reaction conditions may be determined depending on the stability of the starting compound and the intermediate. For example, the reaction may be carried out at a relatively high pH ranging from 4 to 8, preferably from 4 to 6, and at a relatively high temperature ranging from 10° to 50° C., preferably from 20° to 40° C.

The third-step condensation may be carried out at a pH ranging from 3 to 9, preferably from 4 to 6, and at a relatively high temperature ranging from 50° to 110° C., preferably from 60° to 90° C.

The metal salt of the present compound (I) can be given as desired by selecting the kind of the starting compounds, alkali agents usable for neutralization of the acid during the production steps, or electrolytes to be used when the desired compound is, if desired, isolated by salting-out.

The compound (I) produced in accordance with the present invention may be in a liquid form obtained by removing inorganic salts or adding a dyeing improver, if necessary, after completion of the reaction, or may be formed into a powdery product by subjecting the above liquid or the reaction mixture as such to evaporation i.e. spray-drying and the like, or into either liquid or powdery product through salting out of the desired compound in a conventional manner using an electrolyte.

The present compound may be used as a reactive dye for dyeing hydroxyl group-, or amido group-containing materials.

The hydroxyl group-containing materials include natural or synthetic hydroxyl group-containing fiber materials such as cellulose fiber materials, cellulose-containing fiber materials, regenerated products thereof and polyvinyl alcohol. Examples of the cellulose fiber materials are cotton and other vegetable fibers such as linen, hemp, jute and ramie fibers. Examples of the regenerated cellulose fibers are viscose staple and filament viscose. Examples of the cellulose-containing fiber materials are mixed fiber materials such as cellulose/polyester, cellulose/wool, cellulose/acryl and the like.

The amide group-containing materials include synthetic or natural polyamide and polyurethane. Examples of the materials, particularly in the fibrous forms, are wool and other animal furs, silk, leather, polyamide-6,6, polyamide-6, polyamide-11 and polyamide-4.

The dyeing may be carried out in a manner suitable for the reactive groups appended to the fiber-reactive dye.

For example, in the case of dyeing cellulose fiber materials, the dyeing may be carried out by an exhaution dyeing, printing, padding including cold-pad-batch-up method or the like, from which a suitable one may be chosen depending on the property and physical form of the fibers. In these methods, an acid-binding agent such as sodium hydroxide, sodium carbonate, sodium bicarbonate, phosphates, silicates and the like may be used together with the present compound.

More concretely speaking, the exhaustion dyeing may be carried out at a relatively low temperature using a dye bath containing sodium hydroxide or other acid-binding agents, and sodium sulfate or sodium chloride. The printing may be carried out by preparing a dye paste containing a paste or emulsified paste such as sodium alginate and starch ether, alkalis or alkali-liberating agents such as sodium carbonate, sodium bicarbonate, sodium hydroxide, trisodium phosphate, sodium trichloroacetate and the corresponding potassium or alkaline earth metal salts, and if desired, a conventional printing assistant such as urea, and a dispersing agent, applying the dye paste on the fiber, drying and then heat-treating the printed fiber using steam. The cold-pad-batch-up method may be carried out by applying a padding solution to the fiber at ambient temperature, the padding solution comprising an acid-binding aent such as sodium hydroxide alone or a mixture of sodium hydroxide and sodium silicate, sodium carbonate or trisodium phosphate, and if necessary, a dissolving assistant such as urea, and a penetrant, batching up the fiber with a roll, allowing to stand for 3 hours or more, or overnight, and then rinsing and drying to obtain a dyed product.

The present compound is also useful for dyeing or printing the aforesaid cellulose fiber materials or cellulose-containing fiber materials in the absence or presence of the acid binding agent in a small amount enough to show a buffering effect, keeping a dye bath to a pH ranging from 4 to 10.

For dyeing the cellulose fiber materials or cellulose-containing fiber materials, the exhaustion dyeing may be carried out in the absence or presence of the acid binding agent in a small amount as described above at a temperature of 60° to 150° C., if desired in the presence of a neutral salt such as sodium sulfate and sodium chloride optionally together with any one of dissolving assistants, penetrants and level dyeing agents.

This dyeing method is advantageous particularly for dyeing the cellulose-containing fiber materials such as mixed fiber materials of cellulose/polyester, because the dyeing can be carried out in a one bath without decomposition of a disperse dye to be used for dyeing the polyester fibers. In this case, polyester fibers may be first dyed by a high temperature dyeing method or a carrier dyeing method with a disperse dye, and then the cellulose fibers may be dyed with the present compound in the same bath, or vice versa. Alternatively, the cellulose fibers and the polyester fibers may be dyed at the same time with the present compound and disperse dye present in the same bath.

The dyeing of mixed fiber materials of cellulose/wool may be carried out using both the present compound and an acid dye, whereby the mixed fibers can be dyed in the same color without damage of wool.

The dyeing of mixed fiber materials of cellulose/acryl may be carried out using both the present compound and a cationic dye.

In the dyeing of the cellulose fiber materials or cellulose-containing fiber materials using the present compound in the absence of an acid binding agent, a padding or printing may be carried out. For example, the fiber materials can be treated with a padding liquor or printing paste containing no acid binding agent, and then heat-treated at a temperature of 150° C. or higher, if desired after drying at a temperature of 80° to 100° C. The heat-treatment may be carried out preferably at 160° to 250° C., more preferably at 180° to 230° C., and includes, for example, a baking at about 200° C. for several minutes and a steaming at 180° C. for 5 to 10 minutes. This dyeing method is advantageous particularly for dyeing or printing the cellulose/polyester mixed fiber materials.

The present compound can be characterized by excellent dye performances in the dyeing or printing of fiber materials, particularly cellulose or cellulose-containing fiber materials. For example, the compound can give a dyed product excellent in light fastness, perspiration-light fastness, wet fastness such as washing resistance, peroxide-washing resistance, perspiration resistance and acid-hydrolysis resistance, alkali fastness, abrasion fastness and iron fastness. The compound can also exhibit excellent build-up, level-dyeing and washing-off properties, favorable solubility and high exhaustion and fixation percentages. Moreover, the compound can hardly be affected by changes in a dyeing temperature and a dyeing bath ratio, so that a dyed product with a constant quality can be given with superior reproducibility.

The present invention is illustrated in more detail with reference to the following Examples, which are not intended to limit the scope of the present invention. In Examples, parts are by weight.

EXAMPLE 1

1-Amino-4-(4',8'-disulfonaphtho-2'-ylazo)naphthalene-7-sulfonic acid (10.7 parts) was diazotized and then coupled with 1-aminonaphthalene-8-sulfonic acid to obtain an amino dye compound. Cyanuric chloride (3.7 parts) was added to a neutral solution containing the above-obtained compound and water (300 parts), and the mixture was stirred at a temperature between 0° and 20° C. to complete the condensation, while controlling the pH within a range between 4 and 7. To this reaction mixture was added aniline-4-β-sulfatoethylsulfone (5.6 parts) at a temperature between 10° and 40° C., while controlling the pH within a range between 4 and 7, and the mixture was stirred at that pH and at that temperature to complete the condensation. Successively, isonicotinic acid (2.8 parts) was added to the resulting reaction mixture, and the mixture was adjusted to a pH between 5 and 6, heated to 90° C. and then kept for about 10 hours at this temperature. Thus, there was obtained a brown compound represented by a free acid of the following formula.

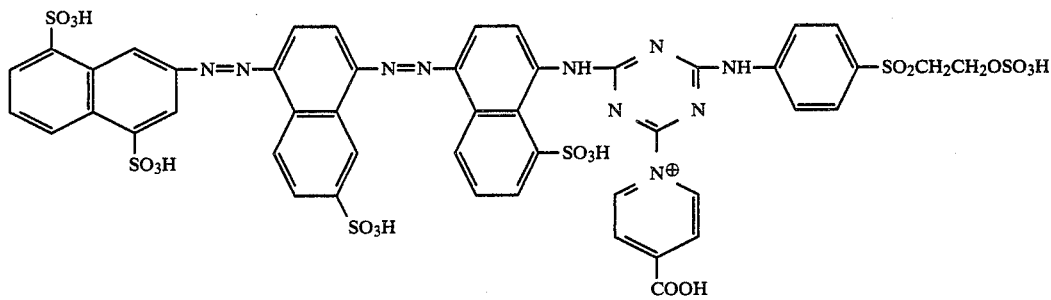

($\lambda_{max}$=485 nm, measured in an aqueous medium, which condition is also applied for all given in the following Examples.)

EXAMPLE 2

2-Aminonaphthalene-3,6,8-trisulfonic acid (7.7 parts) was diazotized and then coupled with 3-ureidoaniline (3.0 parts) in an aqueous solution of hydrochloric acid to obtain an amino dye compound. Cyanuric chloride (3.7 parts) was added to a neutral solution containing the above-obtained compound and water (200 parts), and the mixture was stirred at a temperature between 0° and 20° C. to complete the condensation, while controlling the pH within a range between 4 and 7. To this reaction mixture was added aniline-3-β-sulfatoethylsulfone (5.0 parts) at a temperature between 10° and 40° C., while controlling the pH within a range between 4 and 7, and the mixture was stirred to complete the condensation at that pH and at that temperature. Successively, nicotinic acid (12.3 parts) was added to the above reaction mixture, and the mixture was adjusted to a pH between 5 and 6, heated to 90° C. and then kept for 10 hours at this temperature. Thus, there was obtained reddish yellow compound represented by a free acid of the following formula.

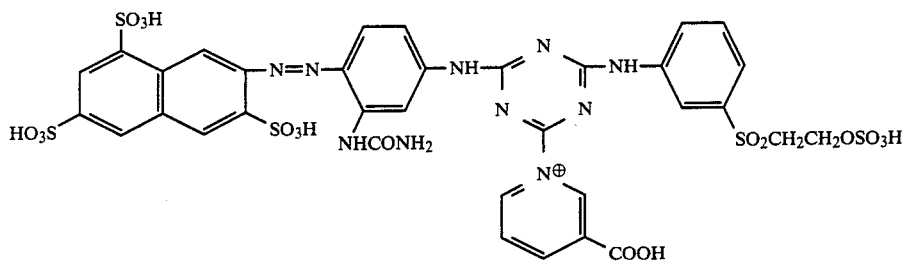

($\lambda_{max}$ = 410 nm)

EXAMPLE 3

In a manner similar to that of Example 1 or 2, the amino dye compound represented by the aforesaid formula (II) shown in a 2nd column of Table 1 is subjected to condensation with cyanuric chloride in an equimolar amount, followed by a condensation with the amine compound of the aforesaid formula (III) shown in a 4th column, and then with the tertiary amine of the aforesaid formula (IV) in a third column, thereby obtaining a compound characterized by a color on cellulose shown in a 5th column. In Table 1, the tertiary amine is abbreviated as follows, which are also the same in Tables 2 to 5.

| | |
|---|---|
| Pyridine | a |
| Nicotinic acid | b |
| Isonicotinic acid | c |
| Picolinic acid | d |
| Nicotinic amide | e |
| Lutidinic acid | f |
| Cinchomeronic acid | g |
| Dinicotinic acid | h |
| Isocinchomeronic acid | i |
| β-Hydroxyethylpyridine | j |
| β-Sulfoethylpyridine | k |
| β-Sulfatoethylpyridine | l |

TABLE 1

| Run No. | Amine dye compound (II) | Tertiary amine (IV) | Amine (III) | Color on cellulose |
|---|---|---|---|---|
| 1 | 2-Aminonaphthalene-1,5-disulfonic acid → 1-Amino-3-acetylaminobenzene | b | 1-Aminobenzene-3-β-sulfatoethylsulfone | Reddish yellow |
| 2 | 2-Aminonaphthalene-1,5-disulfonic acid → 3-Aminophenylurea | " | 1-Aminobenzene-3-β-sulfatoethylsulfone | " |
| 3 | 2-Aminonaphthalene-1,5-disulfonic acid → 1-Amino-3-hydroxyacetylaminobenzene | " | 1-Aminobenzene-3-β-phosphatoethylsulfone | " |
| 4 | 2-Aminonaphthalene-5,7-disulfonic acid → 1-Amino-3-acetylaminobenzene | " | 1-Aminobenzene-2-β-sulfatoethylsulfone | " |
| 5 | 2-Aminonaphthalene-5,7-disulfonic acid → 3-Aminophenylurea | c | 1-Aminobenzene-4-β-sulfatoethylsulfone | " |
| 6 | 2-Aminonaphthalene-4,8-disulfonic acid → 1-Amino-3-methyl-6-methoxybenzene | b | 1-Aminobenzene-3-β-sulfatoethylsulfone | Yellow |
| 7 | 2-Aminonaphthalene-4,8-disulfonic acid → 1-Amino-3-acetylaminobenzene | " | 1-Aminobenzene-3-β-sulfatoethylsulfone | " |
| 8 | 2-Aminonaphthalene-3,6-disulfonic acid → 1-Amino-3-acetylaminobenzene | " | 1-Aminobenzene-3-β-sulfatoethylsulfone sulfatoethylsulfone | Reddish yellow |
| 9 | 2-Aminonaphthalene-3,6-disulfonic acid → 3-Aminophenylurea | e | 1-Aminobenzene-3-β-sulfatoethylsulfone | " |
| 10 | 2-Aminonaphthalene-6,8-disulfonic acid → 1-Amino-3-acetylaminobenzene | a | 1-Aminobenzene-3-β-sulfatoethylsulfone | " |
| 11 | 2-Aminonaphthalene-6,8-disulfonic acid → 1-Amino-2-methoxynaphthalene-6-sulfonic acid | " | 1-Aminobenzene-3-β-sulfatoethylsulfone | " |
| 12 | 2-Aminonaphthalene-3,6,8-trisulfonic acid → 1-Amino-3-acetylaminobenzene | b | 1-Aminobenzene-3-β-sulfatoethylsulfone | " |
| 13 | 2-Aminonaphthalene-3,6,8-trisulfonic acid → 3-Aminophenylurea | " | 1-Aminobenzene-3-β-sulfatoethylsulfone | " |
| 14 | 2-Aminonaphthalene-3,6,8-trisulfonic acid → 1-Amino-3-methylbenzene | " | 1-Aminobenzene-3-β-sulfatoethylsulfone | " |
| 15 | 2-Aminonaphthalene-4,6,8-trisulfonic acid → 1-Amino-3-methylbenzene | " | 1-Aminobenzene-3-β-sulfatoethylsulfone | " |
| 16 | 2-Aminonaphthalene-4,6,8-trisulfonic acid → 1-Amino-3-acetylaminobenzene | d | 1-Aminobenzene-3-β-sulfatoethylsulfone | " |
| 17 | 1-Aminobenzene-2,5-disulfonic acid → 1-Aminonaphthalene-6- | l | 1-Aminobenzene-3-β-sulfatoethylsulfone | " |

TABLE 1-continued

| Run No. | Amine dye compound (II) | Tertiary amine (IV) | Amine (III) | Color on cellulose |
|---|---|---|---|---|
| | sulfonic acid | | | |
| 18 | 1-Aminobenzene-2,5-disulfonic acid → 1-Aminonaphthalene-6-sulfonic acid → 1-Aminonaphthalene-8-sulfonic acid | b | 1-Aminobenzene-3-$\beta$-sulfatoethylsulfone | Reddish brown |
| 19 | 1-Aminonaphthalene-2,5,7-trisulfonic acid → 1-Aminonaphthalene-6-sulfonic acid → 1-Aminonaphthalene-8-sulfonic acid | a | 1-Aminobenzene-3-$\beta$-sulfatoethylsulfone | Violet brown |
| 20 | 1-Aminonaphthalene-2,5,7-trisulfonic acid → 1-Amino-2,5-dimethylbenzene → 1-Aminonaphthalene-6-sulfonic acid | c | 1-Aminobenzene-3-$\beta$-sulfatoethylsulfone | Reddish brown |
| 21 | 4-Aminoazobenzene-3,4'-disulfonic acid → 1-Aminonaphthalene-6-sulfonic acid | " | 1-Aminobenzene-3-$\beta$-sulfatoethylsulfone | Yellowish brown |
| 22 | 1,4-Diaminobenzene-2,5-disulfonic acid → 1-Ethyl-3-sulfomethyl-4-methyl-6-hydroxypyrid-2-one | h | 1-Amino-4-methylbenzene-3-$\beta$-sulfatoethylsulfone | Yellow |
| 23 | 2-Amino-4-acetylaminobenzenesulfonic acid → 1-Ethyl-3-sulfomethyl-4-methyl-6-hydroxypyrid-2-one (saponified product) | k | 1-Aminobenzene-3-$\beta$-sulfatoethylsulfone | " |
| 24 | 2-Amino-4-acetylaminobenzenesulfonic acid → 1-Ethyl-4-methyl-6-hydroxypyrid-2-one (saponified product) | b | 1-Aminobenzene-3-$\beta$-sulfatoethylsulfone | " |
| 25 | 2-Amino-4-acetylaminobenzenesulfonic acid → 1-(2',5'-Dichloro-4'-sulfophenyl)-3-methyl-5-pyrazolone (saponified product) | d | 1-Aminobenzene-3-$\beta$-sulfatoethylsulfone | " |
| 26 | 2-Amino-4-acetylaminobenzenesulfonic acid → 1-(2',5'-Disulfophenyl)-3-methyl-5-pyrazolone (saponified product) | b | 1-Aminobenzene-3-$\beta$-sulfatoethylsulfone | " |
| 27 | 2-Amino-4-acetylaminobenzenesulfonic acid → 1-(4'-Sulfophenyl)-3-carboxy-5-pyrazolone (saponified product) | " | 1-Aminobenzene-3-$\beta$-sulfatoethylsulfone | " |
| 28 | 2-Amino-4-acetylaminobenzenesulfonic acid → 1-(2'-Methyl-4'-sulfophenyl)-3-carboxy-5-pyrazolone (saponified product) | " | 1-Aminobenzene-3-$\beta$-sulfatoethylsulfone | " |
| 29 | 2-Amino-4-acetylaminobenzenesulfonic acid → 1-(4',8'-Disulfonaphtho-2'-yl-3-methyl-5-pyrazolone (saponified product) | j | 1-Aminobenzene-3-$\beta$-sulfatoethylsulfone | " |
| 30 | 1-Aminobenzene-2,5-disulfonic acid → 1-(3'-Aminophenyl)-3-methyl-5-pyrazolone (saponified product) | d | 1-Aminobenzene-3-$\beta$-sulfatoethylsulfone | " |
| 31 | 1-Aminobenzene-2,5-disulfonic acid → 2-Acetylamino-5-hydroxynaphthalene-7-sulfonic acid (saponified product) | b | 1-Aminobenzene-3-$\beta$-sulfatoethylsulfone | Orange |
| 32 | 1-Aminobenzene-2-sulfonic acid 2-Amino-5-hydroxynaphthalene-1,7-disulfonic acid | " | 1-Aminobenzene-3-$\beta$-sulfatoethylsulfone | " |
| 33 | 2-Aminonaphthalene-1,5-disulfonic acid → 2-Acetylamino-5-hydroxynaphthalene-7-sulfonic acid (saponified product) | " | 1-Aminobenzene-3-$\beta$-sulfatoethylsulfone | " |
| 34 | 2-Aminonaphthalene-3,6,8-trisulfonic acid → 2-Acetylamino-5-hydroxynaphthalene-7-sulfonic acid (saponified product) | " | 1-Aminobenzene-3-$\beta$-sulfatoethylsulfone | " |
| 35 | 2-Aminoaphthalene-1,5,7-trisulfonic acid → 1-Acetylamino-5-hydroxynaphthalene-7-sulfonic acid (saponified product) | c | 1-Aminobenzene-3-$\beta$-sulfatoethylsulfone | " |
| 36 | 1-Amino-4-methoxybenzene-2,5-disulfonic acid → 2-Amino-5-hydroxynaphthalene-7-sulfonic acid | b | 1-Aminobenzene-3-$\beta$-sulfatoethylsulfone | Crimson |
| 37 | 1-Amino-4-methoxybenzene-2-sulfonic acid → 2-Amino-5-hydroxynaphthalene-7-sulfonic acid | " | 1-Aminobenzene-3-$\beta$-sulfatoethylsulfone | " |
| 38 | 1-Aminobenzene-2-sulfonic acid → 1-(4'-Nitrobenzoylamino)-8- | a | 1-Aminobenzene-3-$\beta$-sulfatoethylsulfone | Red |

TABLE 1-continued

| Run No. | Amine dye compound (II) | Tertiary amine (IV) | Amine (III) | Color on cellulose |
|---|---|---|---|---|
| | hydroxynaphthalene-3,6-disulfonic acid (reduced product) | | | |
| 39 | 1-Aminobenzene-2,5-disulfonic acid → 1-(3'-Nitrobenzoylamino)-8-hydroxynaphthalene-4,6-disulfonic acid (reduced product) | a | 1-Aminobenzene-3-β-sulfatoethylsulfone | " |
| 40 | 2-Amino-5-aminomethylnaphthalene-1-sulfonic acid → 1-Benzoylamino-8-hydroxynaphthalene-3,6-disulfonic acid | b | 1-Aminobenzene-3-β-sulfatoethylsulfone | " |
| 41 | 2-Aminonaphthalene-1,5-disulfonic acid → 1-(4'-Nitrobenzoylamino)-8-hydroxynaphthalene-3,6-disulfonic acid (reduced product) | f | 1-Aminobenzene-3-β-sulfatoethylsulfone | " |
| 42 | 1-Hydroxy-2-aminobenzene-4-sulfonic acid → 2-Amino-5-hydroxynaphthalene-7-sulfonic acid (Cu complex) | g | 1-Aminobenzene-3-β-sulfatoethylsulfone | Ruby |
| 43 | 1-Hydroxy-2-aminobenzene-4,6-disulfonic acid → 2-Amino-5-hydroxynaphthalene-7-sulfonic acid (Cu complex) | b | 1-Aminobenzene-3-β-chloroethylsulfone | " |
| 44 | 1-Hydroxy-2-aminobenzene-4,6-disulfonic acid → 2-Ethylamino-5-hydroxynaphthalene-7-sulfonic acid (Cu complex) | " | 1-Amino-4-methoxybenzene-3-β-sulfatoethylsulfone | " |
| 45 | 1-Hydroxy-2-aminobenzene-4,6-disulfonic acid → 2-Amino-8-hydroxynaphthalene-3,6-disulfonic acid (Cu complex) | l | 1-Aminobenzene-3-β-sulfatoethylsulfone | " |
| 46 | 1-Hydroxy-2-aminobenzene-4,6-disulfonic acid → 1-Amino-8-hydroxynaphthalene-3,6-disulfonic acid (Cu complex) | " | 1-Aminobenzene-3-β-sulfatoethylsulfone | Violet |
| 47 | 1-Hydroxy-2-aminobenzene-4,6-disulfonic acid → 1-Amino-8-hydroxynaphthalene-4,6-disulfonic acid (Cu complex) | j | 1-Aminobenzene-3-β-sulfatoethylsulfone | " |
| 48 | 1-Hydroxy-2-amino-4-acetylaminobenzene-6-sulfonic acid → 1-Amino-8-hydroxynaphthalene-2,4-disulfonic acid (saponified Cu complex) | e | 1-Aminobenzene-3-β-sulfatoethylsulfone | Blue |
| 49 | 1-Hydroxy-2-amino-6-acetylaminobenzene-4-sulfonic acid → 1-Amino-8-hydroxynaphthalene-2,4-disulfonic acid (saponified Cu complex) | b | 1-Aminobenzene-3-β-sulfatoethylsulfone | " |
| 50 | 1-Amino-2-hydroxy-6-nitronaphthalene-4-sulfonic acid → 1-Amino-8-hydroxynaphthalene-2,4-disulfonic acid (reduced Cu complex) | " | 1-Aminobenzene-3-β-sulfatoethylsulfone | " |
| 51 | 1-Amino-2-hydroxy-6-nitronaphthalene-4-sulfonic acid → 1-Amino-8-hydroxynaphthalene-2,4,6-trisulfonic acid (reduced Cu complex) | d | 1-Aminobenzene-3-β-sulfatoethylsulfone | " |
| 52 | 2-Amino-1-hydroxynaphthalene-4,8-disulfonic acid → 1-Amino-8-hydroxynaphthalene-3,6-disulfonic acid (Cu complex) | k | 1-Aminobenzene-3-β-sulfatoethylsulfone | " |
| 53 | 2-Aminonaphthalene-4,8-disulfonic acid → 2-Hydroxy-3-aminonaphthalene-5,7-disulfonic acid (oxidation Cu—complexed product) | b | 1-Aminobenzene-3-β-sulfatoethylsulfone | " |
| 54 | 3-Methoxy-4-amino-6-methylazobenzene-2',5'-disulfonic acid → 2-Methylamino-5-hydroxynaphthalene-7-sulfonic acid (demethylation Cu—complexed product) | " | 1-Aminobenzene-3-β-sulfatoethylsulfone | Navy blue |
| 55 | 3-Methoxy-4-amino-6-methylazo- | " | 1-Aminobenzene-3-β- | " |

TABLE 1-continued

| Run No. | Amine dye compound (II) | Tertiary amine (IV) | Amine (III) | Color on cellulose |
|---|---|---|---|---|
| | benzene-2',4'-disulfonic acid → 2-Amino-5-hydroxynaphthalene-1,7-disulfonic acid (demethylation Cu—complexed product) | | sulfatoethylsulfone | |
| 56 | 2-Amino-4-acetylaminobenzene-sulfonic acid → 1-Amino-8-hydroxy-2-(4'-sulfophenylazo)-naphthalene-3,6-disulfonic acid (saponified product) | " | 1-Aminobenzene-3-β-sulfatoethylsulfone | " |
| 57 | 1-Amino-4-(3'-amino-2',4',6'-trimethylphenylamino)anthraquinone-2,5'-disulfonic acid | " | 1-Aminobenzene-3-β-sulfatoethylsulfone | Reddish blue |
| 58 | 1-Amino-4-(2',6'-dimethyl-3'-aminomethylphenylamino)-anthraquinone-2,5'-disulfonic acid | " | 1-Aminobenzene-3-β-sulfatoethylsulfone | " |
| 59 | 1-Amino-4-(4'-methyl-2'-amino-methylphenylamino)anthraquinone-2,6'-disulfonic acid | " | 1-Aminobenzene-3-β-sulfatoethylsulfone | " |
| 60 | 1-Amino-4-(5'-aminophenylamino)-anthraquinone-2,2',4'-trisulfonic acid | " | 1-Aminobenzene-3-β-sulfatoethylsulfone | Brill blue |
| 61 | 1-Amino-4-(4'-aminophenylamino)-anthraquinone-2,3'-disulfonic acid | " | 1-Aminobenzene-3-β-sulfatoethylsulfone | " |
| 62 | 1-Amino-4-(4'-aminophenylamino)-anthraquinone-2,2'-disulfonic acid | " | 1-Aminobenzene-3-β-sulfatoethylsulfone | " |
| 63 | 1-Amino-4-(3'-aminophenylamino)-anthraquinone-2,4'-disulfonic acid | " | 1-Aminobenzene-3-β-sulfatoethylsulfone | " |
| 64 | 1-Amino-4-(2'-methyl-3'-amino-phenylamino)anthraquinone-2,5'-disulfonic acid | " | 1-Aminobenzene-3-β-sulfatoethylsulfone | " |
| 65 | 1-Amino-4-(2'-methyl-3'-amino-phenylamino)anthraquinone-2,5',6-trisulfonic acid | a | 1-Aminobenzene-3-β-sulfatoethylsulfone | Greenish blue |
| 66 | 1-Amino-4-(5'-aminomethylphenyl-amino)anthraquinone-2,2',4'-trisulfonic acid | b | 1-Aminobenzene-3-β-sulfatoethylsulfone | Brill blue |
| 67 | 1-Amino-4-(4'-aminocyclohexyl-amino)anthraquinone-2,6-disulfonic acid | a | 1-Aminobenzene-3-β-sulfatoethylsulfone | " |
| 68 | 1-Amino-4-(4'-aminocyclohexyl-amino)anthraquinone-2-sulfonic acid | k | 1-Aminobenzene-5-β-sulfatoethylsulfone-2,4-disulfonic acid | " |
| 69 | 1-Amino-4-(3'-amino-4'-methyl-cyclohexylamino)anthraquinone-2-sulfonic acid | " | 1-Aminobenzene-5-β-sulfatoethylsulfone-2,4-disulfonic acid | " |
| 70 | 1-Amino-4-(3'-amino-2'-methyl-cyclohexylamino)anthraquinone-2-sulfonic acid | j | 1-Aminobenzene-5-β-sulfatoethylsulfone-2,4-disulfonic acid | " |
| 71 | 1-Amino-4-(4'-amino-3'-methyl-cyclohexylamino)anthraquinone-2-sulfonic acid | b | 1-Aminobenzene-5-β-sulfatoethylsulfone-2,4-disulfonic acid | " |
| 72 | 1-Amino-4-(4'-aminomethylcyclo-hexylamino)anthraquinone-2-sulfonic acid | " | 1-Aminobenzene-5-β-sulfatoethylsulfone-2,4-disulfonic acid | " |
| 73 | 1-Amino-4-(3'-aminomethylcyclo-hexylamino)anthraquinone-2-sulfonic acid | " | 1-Aminobenzene-5-β-sulfatoethylsulfone-2,4-disulfonic acid | " |
| 74 | 1-Amino-4-(2'-aminoethylamino)-anthraquinone-2-sulfonic acid | " | 1-Aminobenzene-5-β-sulfatoethylsulfone-2,4-disulfonic acid | " |
| 75 | 1-Amino-4-(2'-methylaminoethyl-amino)anthraquinone-2-sulfonic acid | c | 1-Aminobenzene-5-β-sulfatoethylsulfone-2-sulfonic acid | " |
| 76 | 1-Amino-4-(3'-amino-1-propylamino)-anthraquinone-2-sulfonic acid | d | 1-Aminobenzene-5-β-sulfatoethylsulfone-2-sulfonic acid | " |
| 77 | 1-Amino-4-(3'-methylamino-1-propylamino)anthraquinone-2-sulfonic acid | f | 1-Aminobenzene-5-β-sulfatoethylsulfone-2-sulfonic acid | " |
| 78 | 1-Amino-4-(4'-amino-1-butylamino)-anthraquinone-2-sulfonic acid | h | 1-Aminobenzene-5-β-sulfatoethylsulfone-2-sulfonic acid | " |
| 79 | N—(2-Carboxy-4-sulfophenyl)-N'—(2'-hydroxy-3'-amino-5'-sulfophenyl)-ms-phenylformazan (Cu complex) | b | 1-Aminobenzene-3-β-sulfatoethylsulfone | Blue |

TABLE 1-continued

| Run No. | Amine dye compound (II) | Tertiary amine (IV) | Amine (III) | Color on cellulose |
|---|---|---|---|---|
| 80 | N—(2-Carboxy-5-sulfophenyl)-N'—(2'-hydroxy-3'-amino-5'-sulfophenyl)-ms-phenylformazan (Cu complex) | " | N—Ethylaniline-4-β-sulfatoethylsulfone | " |
| 81 | N—(2-Carboxy-4-sulfophenyl)-N'—(2'-hydroxy-3'-amino-5'-sulfo-sulfophenyl)formazan (Cu complex) | " | 1-Aminobenzene-3-β-sulfatoethylsulfone | " |
| 82 | N—(2-Carboxy-4-aminophenyl)-N'—(2'-hydroxy-3',5'-disulfophenyl)-ms-(3"-sulfophenyl)formazan (Cu complex) | " | 2-Aminonaphthalene-8-β-sulfatoethyl-sulfone | " |
| 83 | N—(2-Carboxy-5-sulfophenyl)-N'—(2'-hydroxy-3',5'-disulfophenyl)-ms-(3"-aminophenyl)formazan (Cu complex) | " | 2-Amino-6-sulfo-naphthalene-8-β-sulfatoethylsulfone | Greenish blue |
| 84 | N—(2-Hydroxy-3-amino-5-sulfo-phenyl)-N'—(2'-hydroxy-4'-sulfophenyl)-ms-(2"-sulfophenyl)-formazan (Cu complex) | " | 1-Aminobenzene-3-β-sulfatoethylsulfone | Navy blue |
| 85 | N—(2-Hydroxy-5-sulfophenyl)-N'—(2'-hydroxy-3',5'-disulfophenyl)- (Cu complex) | c | 1-Aminobenzene-3-β-sulfatoethylsulfone | Blue |
| 86 | N—(2-Hydroxy-5-amino-3-sulfo-phenyl)-N'—(2',5'-disulfophenyl)-ms-(4"-aminophenyl)formazan (Cu complex) | k | 1-Aminobenzene-3-β-sulfatoethylsulfone | " |
| 87 | N—(2-Hydroxy-4,6-disulfophenyl)-N'—(2',4'-disulfophenyl)-ms-(3"-aminophenyl)formazan (Cu complex) | a | 1-Aminobenzene-3-β-sulfatoethylsulfone | " |
| 88 | N—(2-Hydroxy-4-sulfophenyl)-N'—(4'-amino-2'-sulfophenyl)-ms-(4"-chloro-3"-sulfophenyl)-formazan (Cu complex) | " | 1-Aminobenzene-3-β-sulfatoethylsulfone | " |
| 89 | CuPc—(3) with (SO₃H)₂, SO₂NH₂, SO₂NH—C₆H₄—NH₂ | j | 1-Aminobenzene-3-β-sulfatoethylsulfone | Turquoise blue |
| 90 | NiPc—(3) with (SO₃H)₂, SO₂NH₂, SO₂NH—C₆H₄—NH₂ | k | 1-Aminobenzene-3-β-sulfatoethylsulfone | " |
| 91 | CuPc—(3) with (SO₃H)₂, SO₂NH₂, SO₂NH—C₆H₄—NH₂ | l | 1-Aminobenzene-3-β-sulfatoethylsulfone | " |
| 92 | CuPc—(3) with (SO₃H)₂.₇, (SO₂NH—C₆H₄—NH₂)₁.₃ | a | 1-Aminobenzene-3-β-sulfatoethylsulfone | " |

TABLE 1-continued

| Run No. | Amine dye compound (II) | Tertiary amine (IV) | Amine (III) | Color on cellulose |
|---|---|---|---|---|
| 93 | 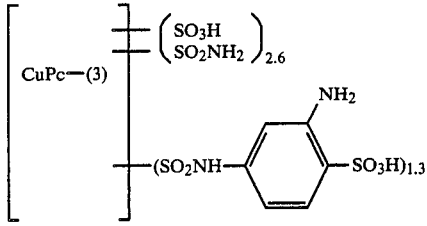 | b | 1-Aminobenzene-3-β-sulfatoethylsulfone | " |
| 94 | 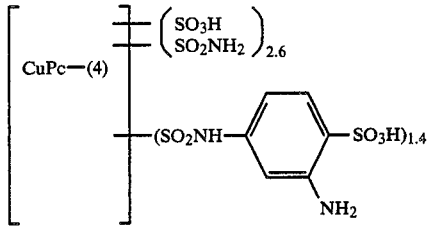 | b | 1-Aminobenzene-3-β-sulfatoethylsulfone | " |
| 95 | 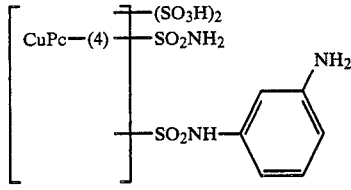 | e | 1-Aminobenzene-3-β-sulfatoethylsulfone | " |
| 96 | 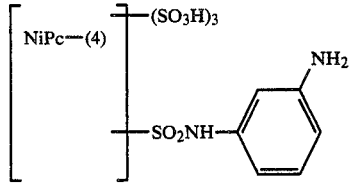 | h | 1-Aminobenzene-3-β-sulfatoethylsulfone | " |
| 97 | 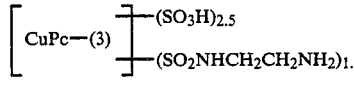 | b | 1-Aminobenzene-3-β-sulfatoethylsulfone | " |
| 98 | 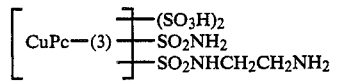 | " | 1-Aminobenzene-3-β-sulfatoethylsulfone | " |

EXAMPLE 4

In a conventional manner, aniline-2,5-disulfonic acid (5.1 parts) was diazotized, and then coupled with 3-ureidoaniline (3.0 parts) to obtain an amino dye compound. To a solution containing the above-obtained amino dye compound and water (100 parts) was added at a temperature between 10° and 40° C. a solution containing water (100 parts) and a dichlorotriazine compound, which had been prepared by the condensation between cyanuric chloride (3.7 parts) and N-ethylaniline-3-β-sulfatoethylsulfone (6.2 parts), while controlling the pH within a range between 4 and 7, and the mixture was stirred at that temperature and at that pH to complete the condensation. Pyridine (2.1 parts) was added to that reaction mixture, and the mixture was adjusted to a pH between 4 and 5, heated to 90° C., and stirred for about 3 hours at that temperature, thereby obtaining a yellow compound represented by a free acid of the following formula.

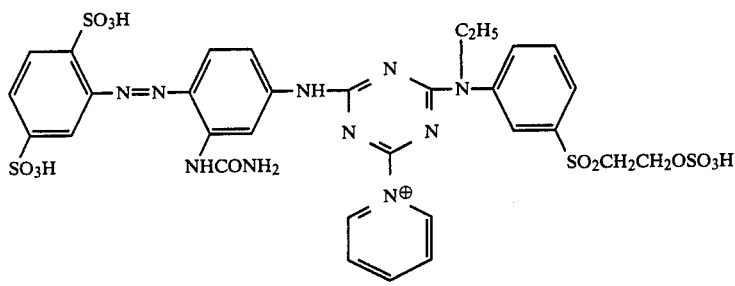

($\lambda_{max}$ = 390 nm)

In a manner similar to that described above, the amino dye compound shown in a 2nd column of Table 2 is subjected to condensation with a product obtained by the first condensation between the amine shown in a 4th column and cyanuric chloride, followed by a condensation with the tertiary amine shown in a 3rd column, thereby obtaining a compound characterized by a color on cellulose shown in a 5th column.

TABLE 2

| Run No. | Amino dye compound (II) | Tertiary amine (IV) | Amine (III) | Color on cellulose |
|---|---|---|---|---|
| 1 | 2-Aminonaphthalene-1,5-disulfonic acid → 1-Amino-3-methylbenzene | b | 1-Aminobenzene-4-$\beta$-sulfatoethylsulfone-2-sulfonic acid | Yellow |
| 2 | 2-Aminonaphthalene-1,5-disulfonic acid → 1-Amino-3-methyl-6-methoxybenzene | b | 1-Aminobenzene-5-$\beta$-sulfatoethylsulfone-2-sulfonic acid | Reddish yellow |
| 3 | 2-Aminonaphthalene-5,7-disulfonic acid → 1-Amino-3-methylbenzene | b | 1-Aminobenzene-5-$\beta$-sulfatoethylsulfone-2-sulfonic acid | Reddish yellow |
| 4 | 2-Aminonaphthalene-4,8-disulfonic acid → N—methylaminobenzene | b | 1-Aminobenzene-5-$\beta$-sulfatoethylsulfone-2-sulfonic acid | Yellow |
| 5 | 2-Aminonaphthalene-4,8-disulfonic acid → 1-N—Ethylamino-3-methylbenzene | d | 1-Aminobenzene-4-$\beta$-sulfatoethylsulfone-2-carboxylic acid | Yellow |
| 6 | 2-Aminonaphthalene-3,6,8-trisulfonic acid → Aniline | b | 1-Aminobenzene-5-$\beta$-sulfatoethylsulfone-2-carboxylic acid | Reddish yellow |
| 7 | 1-Aminonaphthalene-2,5,7-trisulfonic acid → 1-Amino-3-methyl-6-methoxybenzene → 1-Aminonaphthalene-8-sulfonic acid | a | 1-Aminobenzene-2-$\beta$-sulfatoethylsulfone | Reddish brown |
| 8 | 2-Amino-4-acetylaminobenzenesulfonic acid → 1-Ethyl-3-sulfomethyl-4-methyl-6-hydroxypyrid-2-one (saponified product) | a | 1-Amino-2-methoxybenzene-4-$\beta$-sulfatoethylsulfone | Yellow |
| 9 | 2-Amino-4-acetylaminobenzenesulfonic acid → 1-Ethyl-3-carbamoyl-4-methyl-6-hydroxypyrid-2-one (saponified product) | a | 1-Aminobenzene-4-$\beta$-sulfatoethylsulfone | Yellow |
| 10 | 2-Amino-4-acetylaminobenzenesulfonic acid → 1-(4'-Sulfophenyl)-3-methyl-5-pyrazolone (saponified product) | c | 1-Aminobenzene-4-$\beta$-sulfatoethylsulfone | Yellow |
| 11 | 2-Amino-4-acetylaminobenzenesulfonic acid → 1-(5',7'-Disulfonaphtho-2'-yl)-3-methyl-5-pyrazolone (saponified product) | c | 1-Amino-2-chlorobenzene-4-$\beta$-sulfatoethylsulfone | Yellow |
| 12 | 1-Aminobenzene-2,4-disulfonic acid → 2-Acetylamino-5-hydroxynaphthalene-7-sulfonic acid (saponified product) | l | 1-Amino-2-methoxybenzene-5-$\beta$-sulfatoethylsulfone | Orange |
| 13 | 2-Aminonaphthalene-1,5-disulfonic acid → 2-Acetylamino-5-hydroxynaphthalene-7-sulfonic acid (saponified product) | j | 1-Amino-2-methoxybenzene-5-$\beta$-sulfatoethylsulfone | Orange |
| 14 | 1-Amino-4-methoxybenzene-2-sulfonic acid → 2-Amino-5-hydroxynaphthalene-7-sulfonic acid | i | 1-Aminobenzene-5-$\beta$-sulfatoethylsulfone-2,4-disulfonic acid | Crimson |
| 15 | 2-Aminonaphthalene-1,5-disulfonic acid → 2-Acetylamino-8-hydroxynaphthalene-6-sulfonic acid (saponified product) | e | 1-Aminobenzene-4-$\beta$-sulfatoethylsulfone-2-sulfonic acid | Yellowish red |
| 16 | 1-Aminobenzene-2,4-disulfonic | d | 1-Aminobenzene-4-$\beta$- | Red |

TABLE 2-continued

| Run No. | Amino dye compound (II) | Tertiary amine (IV) | Amine (III) | Color on cellulose |
|---|---|---|---|---|
| | acid → 1-(4'-Nitrobenzoylamino)-8-hydroxynaphthalene-3,6-disulfonic acid (reduced product) | | sulfatoethylsulfone-2-sulfonic acid | |
| 17 | 2-Aminonaphthalene-1,5-disulfonic acid → 1-(4'-Nitrobenzoylamino)-8-hydroxynaphthalene-4,6-disulfonic acid (reduced product) | d | 1-Aminobenzene-5-$\beta$-sulfatoethylsulfone-2-sulfonic acid | Red |
| 18 | 1-Hydroxy-2-aminobenzene-4,6-disulfonic acid → 2-Amino-8-hydroxynaphthalene-6-sulfonic acid (Cu complex) | d | 1-Aminobenzene-2-$\beta$-sulfatoethylsulfone | Ruby |
| 19 | 1-Hydroxy-2-aminobenzene-5-sulfonic acid → 1-Amino-8-hydroxynaphthalene-3,6-disulfonic acid (Cu complex) | b | 1-Aminobenzene-4-$\beta$-sulfatoethylsulfone | Violet |
| 20 | 1-Amino-2-hydroxy-6-nitro-naphthalene-4-sulfonic acid → 1-Amino-8-hydroxynaphthalene-2,4-disulfonic acid (reduced Cu complex) | a | 1-Aminobenzene-5-$\beta$-sulfatoethylsulfone-2,4-disulfonic acid | Blue |
| 21 | 1-Hydroxy-2-amino-4-acetyl-aminobenzene-6-sulfonic acid → 1-Amino-8-hydroxynaphthalene-2,4,6-trisulfonic acid (saponified Cu complex) | a | 1-Aminonaphthalene-4-$\beta$-sulfatoethylsulfone | Blue |
| 22 | 2-Amino-1-methylbenzene-3,5-disulfonic acid → 1-Amino-2-methoxy-5-methylbenzene → 2-Amino-5-hydroxynaphthalene-7-sulfonic acid (demethylation Cu-complexed product) | a | 1-Aminobenzene-5-$\beta$-sulfatoethylsulfone-2-sulfonic acid | Navy blue |
| 23 | 2-Amino-4-acetylaminobenzene-sulfonic acid → 1-Amino-8-hydroxy-2-phenylazo-naphthalene-3,6-disulfonic acid (saponified product) | b | 1-Aminobenzene-5-$\beta$-sulfatoethylsulfone-2,4-disulfonic acid | Navy blue |
| 24 | 2-Amino-4-acetylaminobenzene-sulfonic acid → 1-Amino-8-hydroxy-2-(2',5'-disulfophenylazo)-naphthalene-3,6-disulfonic acid (saponified product) | b | 1-Amino-2,5-dimethoxy-benzene-4-$\beta$-sulfato-ethylsulfone | Navy blue |
| 25 | 2-Aminonaphthalene-1,5-disulfonic acid → 1-Amino-8-hydroxy-2-(5'-acetylamino-2'-)sulfophenylazo)naphthalene-3,6-disulfonic acid (saponified product) | b | 1-Aminobenzene-3-$\beta$-sulfatoethylsulfone | Navy blue |

EXAMPLE 5

1-Amino-8-hydroxynaphthalene-3,6-disulfonic acid (6.4 parts) was dissolved in water (150 parts), and cyanuric chloride (3.7 parts) was added to the solution at a temperature between 0° and 20° C., while controlling the pH within a range between 1 and 3. The mixture was stirred at that temperature and at that pH, until no 1-amino-8-hydroxynaphthalene-3,6-disulfonic acid appeared. Thereafter, a solution containing 2-methoxyaniline-5-$\beta$-sulfatoethylsulfone (6.2 parts) and water (50 parts) was added to the above reaction mixture. The mixture was stirred at a temperature between 0° and 20° C. to complete the condensation, while controlling the pH within a range between 1 and 5. The resulting reaction mixture was mixed with 2-aminonaphthalene-1,5-disulfonic acid (6.1 parts) diazotized in a conventional manner to complete the coupling reaction. Successively, nicotinic acid (4.9 parts) was added to the above reaction mixture, and the mixture was adjusted to a pH within a range between 4 and 7, heated to 90° C., and stirred for about 5 hours at that temperature, thereby obtaining a red compound represented by a free acid of the following formula.

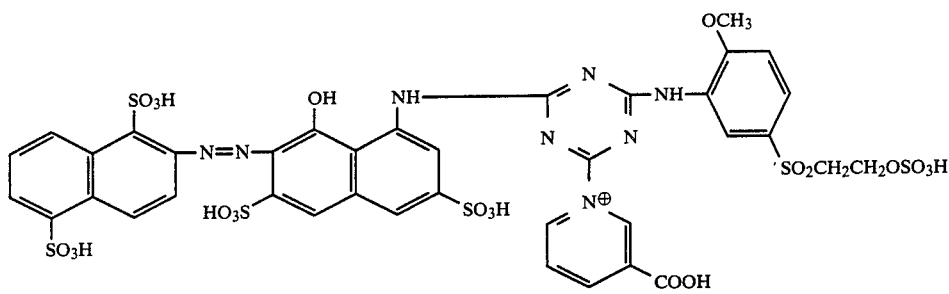

($\lambda_{max}$ = 540 nm)

In a manner similar to that described above, cyanuric chloride was subjected to reaction with the coupling component shown in a 2nd column of Table 3, followed by a reaction with the amine shown in a 4th column or a coupling reaction with the diazo component shown in a 5th column in a suitable order, and then by a condensation with the tertiary amine shown in a 3rd column, thereby obtaining a corresponding compound.

TABLE 3

| Run No. | Coupling component | Tertiary amine (IV) | Amine (III) | Diazo component | Color on cellulose |
|---|---|---|---|---|---|
| 1 | 1-Amino-8-hydroxy-naphthalene-3,6-disulfonic acid | b | 1-Aminobenzene-3-β-sulfatoethylsulfone | 1-Aminobenzene-2-sulfonic acid | Red |
| 2 | 1-Amino-8-hydroxy-naphthalene-4,6-disulfonic acid | b | 1-Aminobenzene-3-β-phosphatoethylsulfone | 1-Aminobenzene-2-sulfonic acid | Red |
| 3 | 1-Amino-8-hydroxy-naphthalene-3,6-disulfonic acid | b | 2-Aminonaphthalene-8-β-sulfatoethylsulfone | 1-Amino-4-carboxybenzene-2-sulfonic acid | Red |
| 4 | 1-Amino-8-hydroxy-naphthalene-3,6-disulfonic acid | b | 1-Aminobenzene-4-β-sulfatoethylsulfone | 1-Amino-4-methylbenzene-2-sulfonic acid | Red |
| 5 | 1-Amino-8-hydroxy-naphthalene-3,6-disulfonic acid | b | 1-Aminobenzene-3-β-sulfatoethylsulfone | 1-Aminobenzene-2,5-disulfonic acid | Red |
| 6 | 1-Amino-8-hydroxy-naphthalene-3,6-disulfonic acid | b | 2-Aminonaphthalene-8-β-sulfatoethylsulfone-6-sulfonic acid | 2-Amino-naphthalene-1-sulfonic acid | Red |
| 7 | 1-Amino-8-hydroxy-naphthalene-4,6-disulfonic acid | b | 1-Aminobenzene-3-β-sulfatoethylsulfone | 2-Amino-naphthalene-1,5-disulfonic acid | Red |
| 8 | 1-Amino-8-hydroxy-naphthalene-3,6-disulfonic acid | b | 1-Aminobenzene-3-β-sulfatoethylsulfone | 2-Amino-naphthalene-1,5-disulfonic acid | Red |
| 9 | 2-Amino-5-hydroxy-naphthalene-7-sulfonic acid | b | 2-Amino-6-sulfonaphthalene-8-β-sulfatoethylsulfone | 2-Amino-5-methoxybenzene-sulfonic acid | Red |

EXAMPLE 6

A neutral aqueous solution containing 1,3-diaminobenzene-4-sulfonic acid (18.8 parts) and water (200 parts) was added to ice water (50 parts) containing cyanuric chloride (18.5 parts), and the mixture was stirred for 2 hours at a temperature between 0° and 5° C., while controlling the pH within a range between 2 and 3. Aniline-3-β-sulfatoethylsulfone (28.1 parts) was added to the above reaction mixture, and the mixture was stirred for 4 hours at 30° C., while controlling the pH within a range between 5 and 6. Successively, sodium nitrite (6.9 parts) was added and completely dissolved in the above reaction mixture, and then the mixture was poured into a mixture containing 35% hydrochloric acid (10 parts) and ice (100 parts). To this diazonium solution was added a neutral aqueous solution containing 1-propionylamino-8-hydroxynaphthalene-3,6-disulfonic acid (37.5 parts) and water (100 parts), and the mixture was stirred for 3 hours at a temperature between 5° and 10° C., while controlling the pH within a range between 6 and 7. Then, nicotinic acid (24.6 parts) was added to that reaction mixture, and the mixture was adjusted to pH 5, heated to 80° C., and stirred for 2 hours at that temperature, while controlling the pH within a range between 4 and 5. After the reaction was over, sodium chloride was added to precipitate crystals, which were then collected on a filter and air-dried at 50° C., thereby obtaining a red compound represented by a free acid of the following formula.

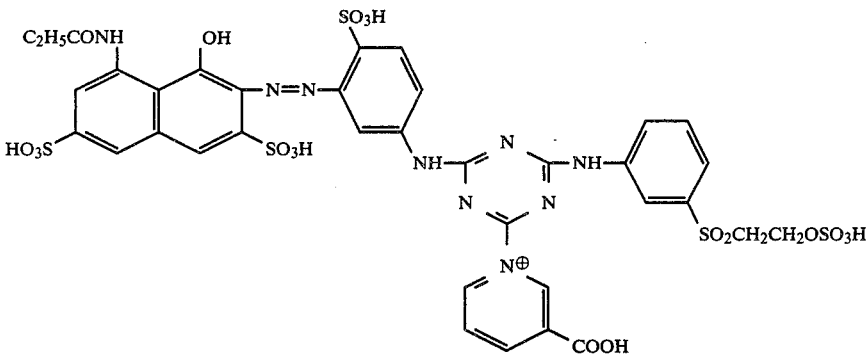

($\lambda_{max}$ = 510 nm)

In a manner similar to that described above, a condensation product between cyanuric chloride and 1,3-diaminobenzene-4-sulfonic acid is subjected to condensation with the amine (III) shown in Table 4, followed by a diazotization and then coupling with the coupling component, and then by a condensation with any one of the aforesaid tertiary amines a to l, thereby obtaining a corresponding compound.

TABLE 4

| Run No. | Amine (III) | Coupling component | Color on cellulose |
|---|---|---|---|
| 1 | 1-Aminobenzene-3-β-sulfatoethylsulfone | 1-(4'-Sulfophenyl)-3-methyl-5-pyrazolone | Yellow |
| 2 | 1-Aminobenzene-3-β-sulfatoethylsulfone | 1-(2',5'-Dichloro-4'-sulfophenyl)-3-methyl-5-pyrazolone | " |
| 3 | 1-Aminobenzene-3-β-phosphatoethylsulfone | 1-(2',5'-Dichloro-4'-sulfophenyl)-3-methyl-5-pyrazolone | " |
| 4 | 1-Aminobenzene-3-β-sulfatoethylsulfone | 1-(4',8'-Disulfonaphto-2'-yl)-3-methyl)-5-pyrazolone | Reddish yellow |
| 5 | 1-Aminobenzene-3-β-sulfatoethylsulfone | 1-Ethyl-3-carbamoyl-4-methyl-6-hydroxypyrid-2-one | " |
| 6 | 1-Aminobenzene-3-β-sulfatoethylsulfone | 4-Amino-2,5-disulfoacetoacetic anilide | Yellow |
| 7 | 1-Aminobenzene-3-β-chloroethylsulfone | 1-Hydroxynaphthalene-4-sulfonic acid | Bluish red |
| 8 | 3-(N—Methyl-β-sulfatoethylsulfonylamino)-1-aminobenzene | 1-Hydroxynaphthalene-4,6-disulfonic acid | Red |
| 9 | 1-Aminobenzene-3-β-sulfatoethylsulfone | 2-Hydroxynaphthalene-6-sulfonic acid | " |
| 10 | 3-(N—Ethyl-β-sulfatoethylsulfonylamino)-1-aminobenzene | 2-Hydroxynaphthalene-3,6-disulfonic acid | " |
| 11 | 1-Aminobenzene-3-β-sulfatoethylsulfone | 2-Acetylamino-5-hydroxynaphthalene-7-sulfonic acid | Crimson |
| 12 | 1-Aminobenzene-3-β-sulfatoethylsulfone | 1-Acetylamino-5-hydroxynaphthalene-7-sulfonic acid | Red |
| 13 | 1-Aminobenzene-3-β-sulfatoethylsulfone | 1-Acetylamino-8-hydroxynaphthalene-3,6-disulfonic acid | Bluish red |
| 14 | 1-Aminobenzene-3-β-sulfatoethylsulfone | 1-Benzoylamino-8-hydroxynaphthalene-3,6-disulfonic acid | Red |
| 15 | 1-Aminonaphthalene-4-β-sulfatoethylsulfone | 1-Benzoylamino-8-hydroxynaphthalene-4,6-disulfonic acid | " |
| 16 | 1-Aminobenzene-3-β-sulfatoethylsulfone | 2-Acetylamino-8-hydroxynaphthalene-6-sulfonic acid | " |
| 17 | 1-Aminobenzene-3-β-sulfatoethylsulfone | 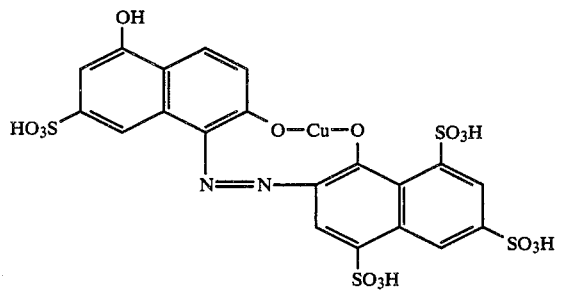 | Reddish blue |

TABLE 4-continued

| Run No. | Amine (III) | Coupling component | Color on cellulose |
|---|---|---|---|
| 18 | 1-Aminobenzene-3-β-sulfatoethylsulfone | [structure: 1-amino-8-hydroxy-3,6-disulfo-naphthalene coupled via N=N to phenyl-SO$_3$H at position 2] | Blue |

Similarly, the diaminobenzene sulfonic acid shown in a third column of Table 5 is used in place of 1,3-diaminobenzene-4-sulfonic acid used above to react with the amine (III), followed by diazotization and coupling with the coupling component in a 4th column, and then by condensation with any one of the aforesaid tertiary amines a to l, thereby obtaining a corresponding compound.

color having excellent various fastness properties with a good build-up property.

The compound was found to have a favorable solubility, good level dyeing property and superior reproducibility of the dyeing.

In addition, the dyeing was carried out at a temperature of 35° C. and 80° C., respectively, in place of the above 60° C.-dyeing, whereby the similar dyed prod-

TABLE 5

| Run No. | Amine (III) | Diaminobenzene sulfonic acid | Coupling component | Color on cellulose |
|---|---|---|---|---|
| 1 | 1-Aminobenzene-4-β-sulfatoethylsulfone | 1,4-Diaminobenzene-2,5-disulfonic acid | 1-(3'-Sulfophenyl)-3-methyl-5-pyrazolone | Yellow |
| 2 | 1-Aminobenzene-4-β-sulfatoethylsulfone | 1,4-Diaminobenzene-2,5-disulfonic acid | 1-(3'-Sulfophenyl)-3-methyl-5-aminopyrazol | Yellow |
| 3 | 1-Aminobenzene-4-β-sulfatoethylsulfone | 1,4-Diaminobenzene-2,5-disulfonic acid | 1-(2',5'-Dichloro-4'-sulfophenyl)-3-methyl-5-pyrazolone | Yellow |
| 4 | 1-Aminobenzene-4-β-sulfatoethylsulfone | 1,4-Diaminobenzene-2,5-disulfonic acid | 1-(5',7'-Disulfonaphtho-2'-yl)-3-methyl-5-pyrazolone | Yellow |
| 5 | 1-Aminobenzene-4-β-sulfatoethylsulfone | 1,4-Diaminobenzene-2,5-disulfonic acid | 1-Ethyl-3-sulfomethyl-4-methyl-6-hydroxypyrid-2-one | Yellow |
| 6 | 1-Aminobenzene-4-β-sulfatoethylsulfone | 1,4-Diaminobenzene-2,5-disulfonic acid | 2-Aminonaphthalene-6-sulfonic acid | Orange |
| 7 | 1-Aminobenzene-4-β-sulfatoethylsulfone | 1,4-Diaminobenzene-2,5-disulfonic acid | 2-Aminonaphthalene-5,7-disulfonic acid | Orange |
| 8 | 1-Aminobenzene-4-β-sulfatoethylsulfone | 1,4-Diaminobenzene-2,5-disulfonic acid | 2-N—Methylamino-8-hydroxy-naphthalene-6-sulfonic acid | Orange |
| 9 | 1-Aminobenzene-4-β-sulfatoethylsulfone | 1,3-Diaminobenzene-4-sulfonic acid | 2-Hydroxynaphthalene-3,6-disulfonic acid | Crimson |
| 10 | 1-Aminobenzene-4-β-sulfatoethylsulfone | 1,3-Diaminobenzene-4-sulfonic acid | 2-Acetylamino-5-hydroxy-naphthalene-7-sulfonic acid | Orange |
| 11 | 1-Aminobenzene-4-β-sulfatoethylsulfone | 1,3-Diaminobenzene-4-sulfonic acid | 1-Benzoylamino-8-hydroxy-naphthalene-3,6-disulfonic acid | Red |
| 12 | 1-Aminobenzene-4-β-sulfatoethylsulfone | 1,3-Diaminobenzene-4-sulfonic acid | 1-Acetylamino-8-hydroxy-naphthalene-4,6-disulfonic acid | Red |
| 13 | 1-Aminobenzene-4-β-sulfatoethylsulfone | 1,4-Diaminobenzene-2-sulfonic acid | 1-(2'-Methyl-4'-sulfo-phenyl)-3-carboxy-5-pyrazolone | Yellow |
| 14 | 1-Aminobenzene-4-β-sulfatoethylsulfone | 1,4-Diaminobenzene-2-sulfonic acid | 1-(2'-Chloro-5'-sulfo-phenyl)-3-methyl-5-pyrazolone | Yellow |

DYEING EXAMPLE 1

The compound obtained in Example 1 (0.1, 0.3 and 0.6 part) was respectively dissolved in water (200 parts) and sodium sulfate (10 parts) and cotton (10 parts) were added thereto. The bath was heated to 60° C., and then sodium carbonate (4 parts) was added thereto. At this temperature, the dyeing was continued for 1 hour. The cotton was rinsed with water, soaped, again rinsed with water, and dried to obtain a dyed product of a brown ucts were obtained, respectively.

A similar result was also found on the cotton portion in the dyeing of 1:1 mixed cotton/polyester fiber.

DYEING EXAMPLE 2

The compound obtained in Example 1 (4.5 parts), urea (10.0 parts), a 10% aqueous solution of sodium alginate thickening agent (50.0 parts), sodium m-nitrobenzenesulfonate (1.0 parts) and sodium hydrogen carbonate (1.0 parts) were mixed with water to make the total weight 100 parts. Cotton was printed with the thus obtained printing paste, then dried, and steamed for 5 minutes at 102° C. The printed product was rinsed with cool water and then hot water, and dried. The thus printed product of a brown color exhibited an excellent washing fastness.

A similar printed product was obtained by a steaming conducted for 6 minutes at 175° C. in place of the above steaming conducted for 5 minutes at 102° C.

A similar result was also found on the cotton portion in the dyeing of 1:1 mixed cotton/polyester fiber.

DYEING EXAMPLE 3

A mixture of the compound obtained in Example 1 (2.0 parts) and sodium m-nitrobenzenesulfonate (0.5 part) was dissolved in water (100 parts). Cotton fabric was dipped in the above solution, squeezed up to 75% in the weight increase, and dried. The fabric was then dipped in a 20° C. solution containing 5 g/l sodium hydroxide and 300 g/l sodium chloride, and squeezed up to 75% in the weight increase. The resulting fabric was steamed for 30 seconds at 200° C., then rinsed with water, soaped for 15 minutes in a boiling solution containing 30% of a nonionic detergent, again rinsed with water, and dried, thereby obtaining a dyed product of a brown color.

Further, the above manner was repeated, provided that the steaming conducted for 30 seconds at 200° C. was replaced by a baking at 210° C. for 1 minute, a baking at 180° C. for 3 minutes and a baking at 150° C. for 5 minutes, respectively. In all cases, the results were similar to that described above.

A similar result was also found on the cotton portion in the dyeing of 1:1 mixed cotton/polyester fiber.

DYEING EXAMPLE 4

The compound obtained in Example 1 (0.1, 0.3 and 0.6 part) was respectively dissolved in water (200 parts), and sodium sulfate (12 parts) and cotton (10 parts) were added thereto. The bath was heated to 80° C., and the dyeing was continued for 1 hour at this temperature. The cotton was rinsed with water, soaped, again rinsed with water, and then dried to obtain a dyed product of a brown color having excellent various fastness properties with good build-up property.

The compound was found to have a favorable solubility, good level dyeing property and superior reproducibility of the dyeing.

In the above procedure, a buffer comprising $Na_2HPO_4 \cdot 2H_2O$ (0.4 part) and $KH_2PO_4$ (0.1 part) was used in order to obtain a good reproducibility of the dyeing. As a result, there was obtained a desired result.

A similar result was obtained when the heating to 80° C. was replaced by a heating to 120° C. over 30 minutes.

Further, a similar result was also found on the cotton portion in the dyeing of 1:1 mixed cotton/polyester fiber.

DYEING EXAMPLE 5

The compound obtained in Example 1 (5 parts), urea (20 parts), and a 10% aqueous solution of sodium alginate thickening agent (50 parts) were mixed with water to make the total weight 100 parts. Cotton was printed with the thus obtained printing paste, dried and then steamed at 180° C. for 10 minutes. The printed product was rinsed with cool water and then hot water, and dried. The thus printed product of a brown color exhibited a good washing fastness.

A similar printed product was obtained when the steaming at 180° C. for 10 minutes was replaced by a baking at 200° C. for 1 minute.

Further, similar result was also found on the cotton portion in the dyeing of 1:1 mixed cotton/polyester fiber.

DYEING EXAMPLE 6

A mixture of the compound obtained in Example 1 (2.0 parts) and sodium m-nitrobenzenesulfonate (0.5 part) was dissolved in water (100 parts). Cotton fabric was dipped in the above solution, squeezed up to 75% in the weight increase, and then dried. The fabric was steamed at 200° C. for 2 minutes, rinsed, soaped for 15 minutes in a boiling solution containing 30% of a nonionic detergent, again rinsed and dried to obtain a dyed product of a brown color.

While, the above manner was repeated, provided that the steaming conducted at 200° C. for 2 minutes was replaced by a baking at 210° C. for 3 minutes, a baking at 180° C. for 5 minutes and a baking at 150° C. for 7 minutes, respectively. In all cases, the results were similar to that obtained above.

In order to obtain a good reproducibility of the dyeing, the dyeing was carried out using a buffer to keep the pH within a range between 4 and 10, whereby a desired result was obtained.

Further, a similar result was found on the cotton portion in the dyeing of 1:1 mixed cotton/polyester fiber.

DYEING EXAMPLE 7

In each manner similar to that in Dyeing Examples 1 to 6, each compound obtained in Examples 2 to 6 was used for the dyeing to obtain each dyed product having excellent properties.

DYEING EXAMPLE 8

The compound obtained in Run No. 1 of Table 3 (0.5 part), Sumikaron Brilliant Red SE-BL (disperse dye produced by Sumitomo Chemical Co., Ltd., C.I. Disperse Red 164) (1 part), sodium sulfate (60 parts), sodium m-nitrobenzenesulfonate (1 part), and a dispersing agent of naphthalenesulfonic acid/formaline condensate (2 parts) were mixed with water to make the total 1000 parts by volume, which was then adjusted to pH 6 with a buffer composed of acetic acid and sodium acetate. Into the resulting aqueous dye bath, 35:65 mixed cotton/polyester cloth (50 parts) was introduced. The bath was heated to 140° C. over 20 minutes, and the dyeing was continued for 60 minutes at that temperature. Thereafter, the bath was gradually cooled. At the time when the temperature reached 80° C., the waste liquor was discharged. Then, water (1000 parts) was charged to wash the dyed product, and then discharged. Successively, the product was soaped in a solution composed of an anionic surfactant (2 parts), sodium carbonate (2 parts) and water (1000 parts) for 20 minutes at 100° C., then washed with water and dried. Thus, both the polyester and cotton fibers were able to be dyed in the same color in a one-bath one-step dyeing manner. The dyed product was found to be deep in the color and excellent in wet fastness and light fastness.

What is claimed is:

1. A compound, or a salt thereof, of the following formula,

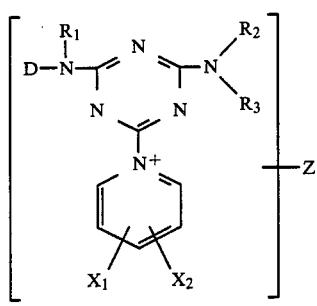

wherein D is an organic dye moiety, $R_1$ and $R_2$ are independently hydrogen or a, lower alkyl unsubstituted or substituted with hydroxy, carboxy, sulfo, carbamoyl, cyano or methoxycarbonyl, $R_3$ is hydrogen, or a lower alkyl unsubstituted or substituted with hydroxy, cyano, methoxy, ethoxy, chloro, bromo, carboxy, carbamoyl, methoxycarbonyl, ethoxycarbonyl, sulfo and sulfamoyl, phenyl unsubstituted or substituted with chloro, bromo, methyl, ethyl, methoxy, ethoxy and sulfo or napthyl unsubstituted or substituted with sulfo, $X_1$ and $X_2$ are independently hydrogen, halogen or a lower alkyl, cyano, carbamoyl, vinyl, $\beta$-hydroxyethyl, $\beta$-sulfoethyl, $\beta$-sulfatoethyl, carboxyl, alkoxycarbonyl or sulfo, Z is appended to the above-defined D or $R_2$ and stands for $-SO_2CH=CH_2$ or $-SO_2CH_2CH_2Y$ in which Y is a group capable of being split by the action of an alkali.

2. A compound, or a salt thereof, of the following formula,

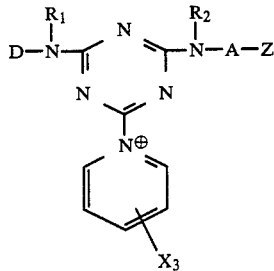

wherein D is an organic dye moiety, $R_1$ and $R_2$ are independently hydrogen or a lower alkyl unsubstituted or substituted with hydroxy, carboxy, sulfo, carbamoyl, cyano or methoxycarbonyl, A is

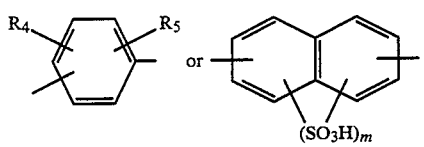

in which $R_4$ and $R_5$ are independently hydrogen, chlorine, bromine or a methyl, methoxy, ethyl, ethoxy, carboxyl or sulfonic acid group, and m is 0 or 1, $X_3$ is a carbamoyl, $\beta$-hydroxyethyl, $\beta$-sulfoethyl, $\beta$-sulfatoethyl, carboxyl or sulfonic acid group, and Z is $-SO_2CH=CH_2$ or $-SO_2CH_2CH_2Y$ in which Y is a group capable of being split by the action of an alkali.

3. A compound, or a salt thereof, of the following formula,

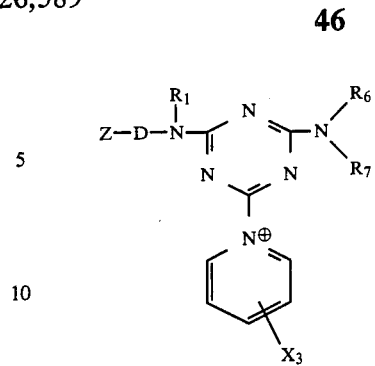

wherein D is an organic dye moiety, $R_1$ is hydrogen or a lower alkyl unsubstituted or substituted with hydroxy, carboxy, sulfo, carbamoyl, cyano or methoxycarbonyl, $R_6$ and $R_7$ are independently hydrogen or a lower allkyl unsubstituted or substituted with methoxy, ethoxy, chloro, cyano, carboxy, sulfo and hydroxy, phenyl unsubstituted or substituted with methyl, chloro, methoxy, ethoxy, sulfo and carboxy or naphthyl unsubstituted or substituted with sulfo, $X_3$ is a carbamoyl, $\beta$-hydroxyethyl, $\beta$-sulfoethyl, $\beta$-sulfatoethyl, carboxyl or sulfonic acid group, and Z is $-SO_2CH=CH_2$ or $-SO_2CH_2CH_2Y$ in which Y is a group capable of being split by the action of an alkali.

4. A compound, or a salt thereof, of the following formula,

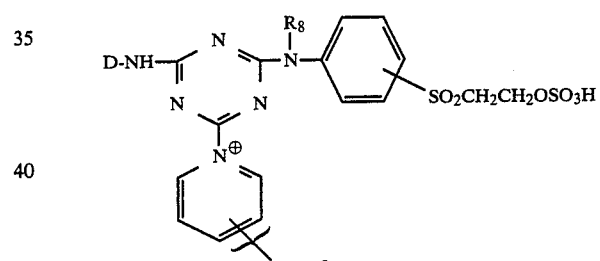

wherein D is an organic dye moiety, and $R_8$ is hydrogen or a methyl or ethyl group.

5. A compound, or a salt thereof, of the following formula,

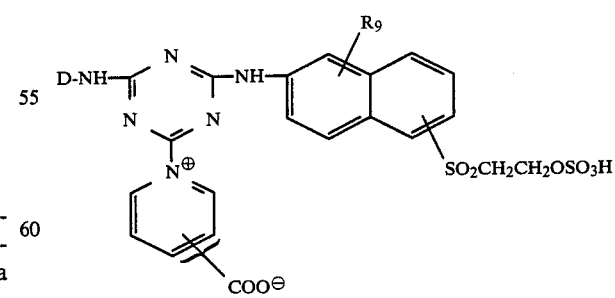

wherein D is an organic dye moiety, and $R_9$ is hydrogen or a sulfonic group.

6. A compound, or a salt thereof, of the following formula,

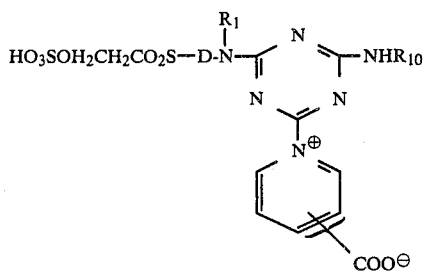
wherein D is an organic dye moiety, $R_1$ is hydrogen or a lower alkyl unsubstituted or substituted with hydroxy, carboxy, sulfo, carbamoyl, cyano or methoxycarbonyl, and $R_{10}$ is a phenyl unsubstituted or substituted with methyl, chloro, methoxy, ethoxy, sulfo and carboxy, or naphthyl unsubstituted or substituted with sulfo.
* * * * *